US010680389B2

(12) United States Patent
Little

(10) Patent No.: US 10,680,389 B2
(45) Date of Patent: *Jun. 9, 2020

(54) INTERCONNECTION SYSTEM

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Terrance F. Little, Fullerton, CA (US)

(73) Assignees: FOXCONN (KUNSHAN) COMPUTER CONNECTOR CO., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,010

(22) Filed: Apr. 22, 2019

(65) Prior Publication Data
US 2019/0326710 A1 Oct. 24, 2019

Related U.S. Application Data

(60) Provisional application No. 62/660,947, filed on Apr. 21, 2018.

(51) Int. Cl.
*H01R 13/659* (2011.01)
*H01R 12/72* (2011.01)
*H01R 12/71* (2011.01)
*G02B 6/42* (2006.01)
*H01R 13/6594* (2011.01)
*H01R 13/66* (2006.01)
(Continued)

(52) U.S. Cl.
CPC ........... *H01R 13/659* (2013.01); *G02B 6/42* (2013.01); *H01R 12/716* (2013.01); *H01R 12/721* (2013.01); *H01R 13/6582* (2013.01); *H01R 13/6587* (2013.01); *H01R 13/6594* (2013.01); *H01R 13/6658* (2013.01)

(58) Field of Classification Search
CPC ...... H01R 12/62; H01R 12/592; H01R 12/68; H01R 13/659; H01R 12/721; H01R 12/716; H01R 13/6594; H01R 13/6658; H01R 13/6582; H01R 13/6587
USPC .... 439/67, 498, 493, 607.21, 607.23–607.26
See application file for complete search history.

(56) References Cited

U.S. PATENT DOCUMENTS 3,727,168 A * 4/1973 Henschen ................ H01B 7/08
439/498
4,087,146 A * 5/1978 Hudson, Jr. .......... H01R 23/722
439/493

(Continued)

*Primary Examiner* — Gary F Paumen
(74) *Attorney, Agent, or Firm* — Wei Te Chung; Ming Chieh Chang

(57) ABSTRACT

An electrical receptacle connector is mounted within a metallic cage for mating with a QSFP module received within the cage. The contacts of the cable receptacle connector are arranged with two groups, of which one are connected to the printed circuit board on which the cage is mounted, and the other are connected to the wires which are further connected to a board-mount receptacle connector mounted on another printed circuit board on which the CPU (Central Processing Unit) socket is mounted. Each board-mount receptacle connector corresponds to more than one cable receptacle connector.

19 Claims, 56 Drawing Sheets

(51) Int. Cl.
*H01R 13/6582* (2011.01)
*H01R 13/6587* (2011.01)

(56) References Cited

U.S. PATENT DOCUMENTS

| | | | |
|---|---|---|---|
| 6,558,191 B2 * | 5/2003 | Bright | G02B 6/4246 |
| | | | 439/541.5 |
| 7,744,416 B2 | 6/2010 | Hon Hai | |
| 8,764,478 B2 * | 7/2014 | Lin | H01R 13/665 |
| | | | 439/498 |
| 8,845,364 B2 | 9/2014 | Molex | |
| 9,011,177 B2 | 4/2015 | Molex | |
| 9,022,800 B2 * | 5/2015 | Yang | H01R 13/6581 |
| | | | 439/487 |
| 9,553,381 B2 | 1/2017 | Molex | |
| 9,590,366 B1 | 3/2017 | Tyco | |
| 9,705,258 B2 | 7/2017 | Te | |
| 2004/0106306 A1 * | 6/2004 | Miyamura | H01R 12/62 |
| | | | 439/67 |
| 2006/0030171 A1 * | 2/2006 | Hung | H05K 1/118 |
| | | | 439/67 |
| 2008/0287005 A1 * | 11/2008 | Kameda | G06F 1/184 |
| | | | 439/498 |
| 2016/0118750 A1 * | 4/2016 | Guo | H01R 13/6585 |
| | | | 439/78 |
| 2016/0218455 A1 | 7/2016 | Samtec | |
| 2016/0380389 A1 * | 12/2016 | Ju | H01R 13/6585 |
| | | | 439/607.05 |
| 2017/0077643 A1 | 3/2017 | Samtec | |
| 2018/0006416 A1 | 1/2018 | Molex | |
| 2018/0034175 A1 | 2/2018 | Molex | |
| 2019/0293884 A1 * | 9/2019 | Little | H01R 25/003 |
| 2019/0312389 A1 * | 10/2019 | Little | H01R 12/716 |

* cited by examiner

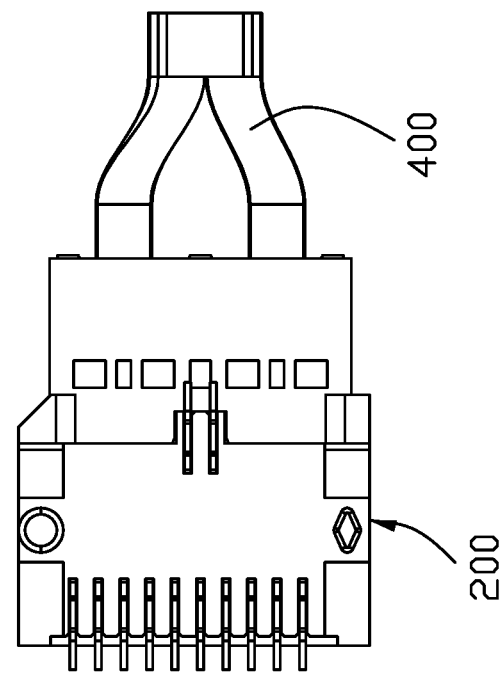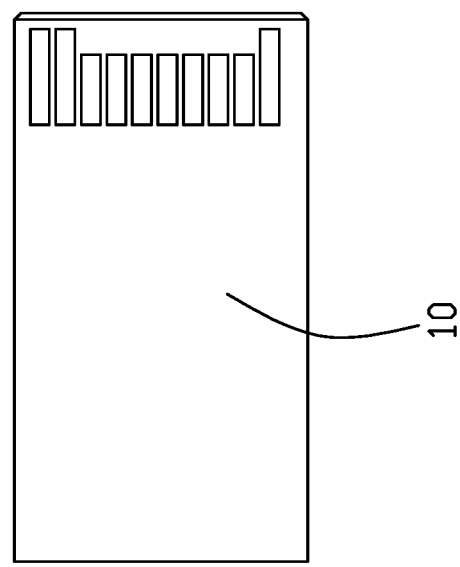
FIG. 15(B)

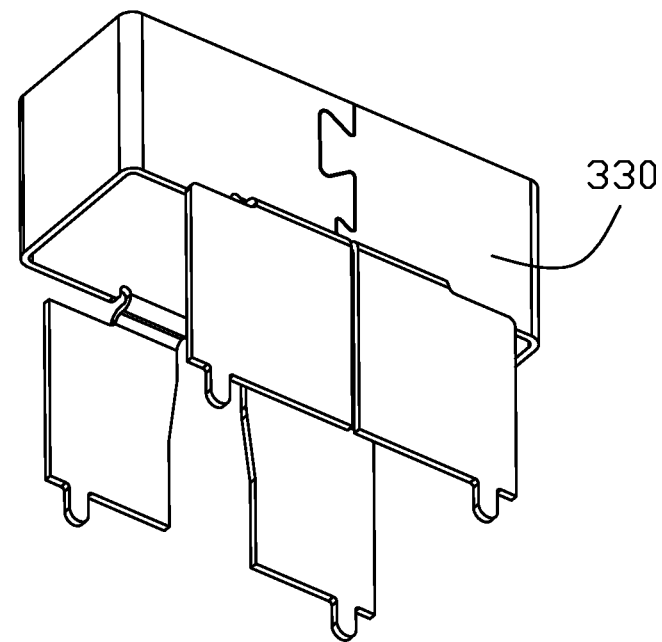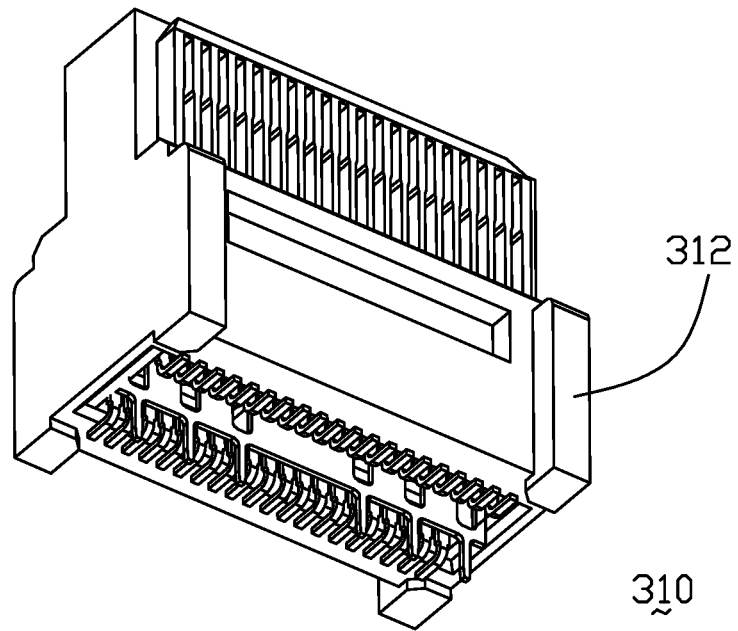
FIG. 17(B)

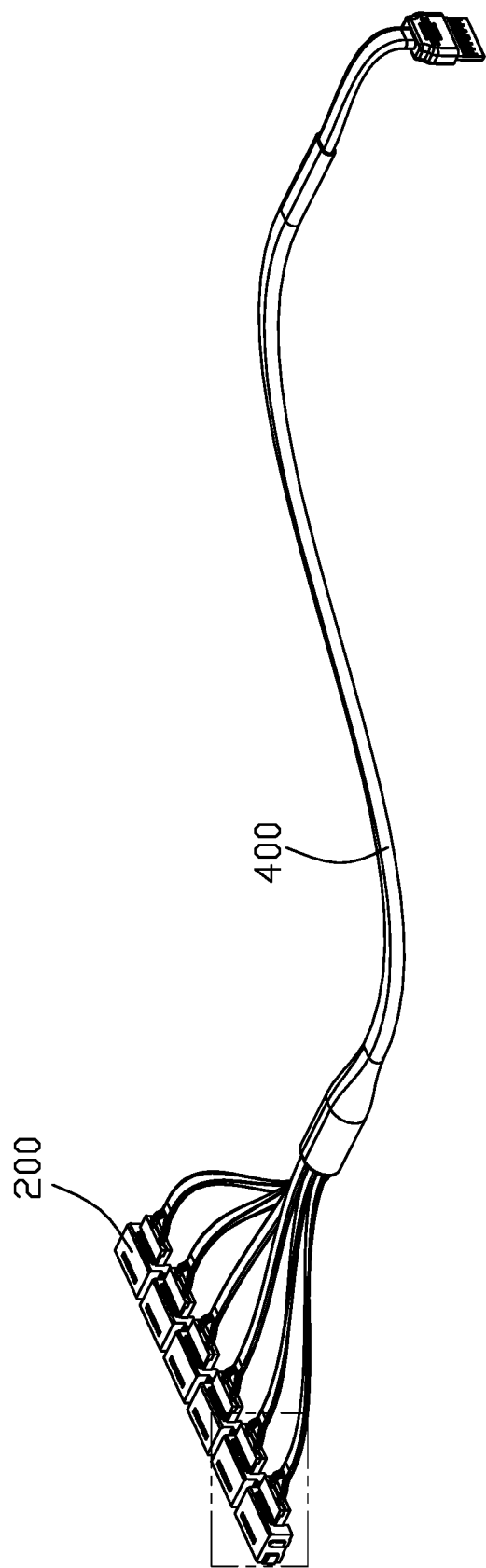

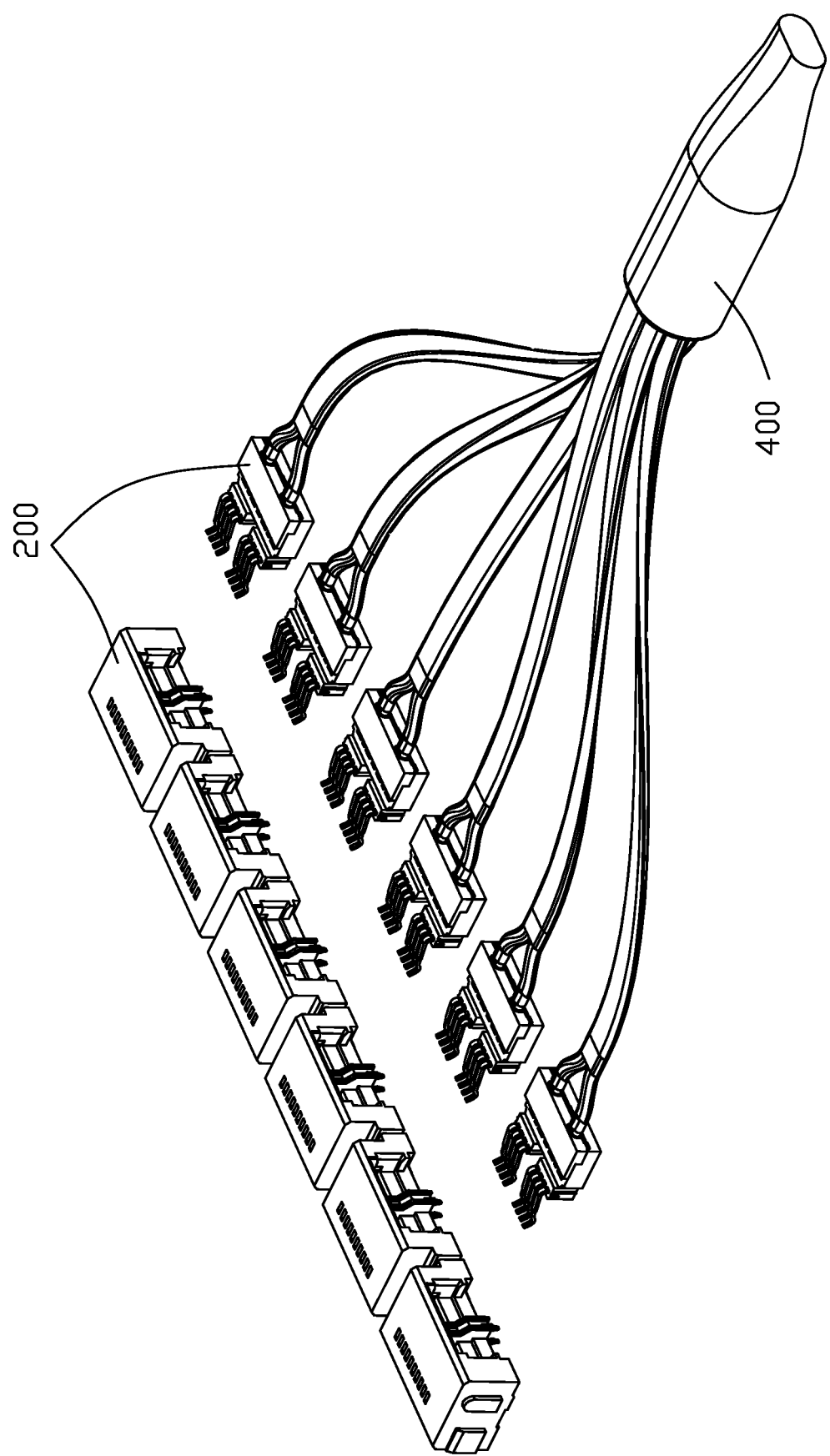

US 10,680,389 B2

INTERCONNECTION SYSTEM

BACKGROUND OF THE INVENTION

1. Field of the Invention

The present invention relates to an electrical connector assembly, especially to the receptacle connector equipped with cable to transmit high speed signal instead of mounting to PCB by following the spirit of the previous designs of which the provisional applications have Ser. Nos. 62/367,098 filed on Jul. 26, 2016, 62/399,272 filed on Sep. 23, 2016, 62/412,841 filed on Oct. 26, 2016, 62/425,627 filed on Nov. 23, 2016, 62/449,133 filed on Jan. 23, 2017, 62/509,141 filed on May 21, 2017, 62/522,113 filed on Jun. 20, 2017, 62/533,131 filed on Jul. 17, 2017, 62/584,751 filed on Nov. 11, 2017, 62/614,366 filed on Jan. 6, 2018, 62/635,508 filed on Feb. 26, 2018, 62/645,823 filed on Mar. 21, 2018, and 62/652,332 filed on Apr. 4, 2018.

2. Description of Related Arts

A traditional design between the receptacle connector, which is located at the rear end of the cage for coupling with a QSFP or other type module, and a CPU is through the traces on the printed circuit board on which the CPU socket is mounted. Anyhow, conductive traces on the printed circuit board have their own limitations for high speed high frequency signal transmission.

Therefore, a new arrangement for the QSFP or other type connection without involvement via the traces on the printed circuit board but via the wires, is desired.

SUMMARY OF THE INVENTION

To achieve the above-mentioned object, an electrical cable receptacle connector is mounted within a metallic cage for mating with a QSFP module received within the cage. The contacts of the cable receptacle connector are arranged with two groups, of which one are connected to the printed circuit board on which the cage is mounted, and the other are connected to the wires which are further connected to a board-mount receptacle connector mounted on another printed circuit board adjacent to the CPU (Central Processing Unit) socket.

Other objects, advantages and novel features of the invention will become more apparent from the following detailed description when taken in conjunction with the accompanying drawings.

BRIEF DESCRIPTION OF THE DRAWINGS

FIG. 15(B) is a bottom view of the cable receptacle connector and the mating tongue of the corresponding QSFP module with the associated cable of the electrical interconnection system of FIG. 10;

FIG. 17(B) is another exploded perspective view of the board-mount receptacle connector of the electrical interconnecting system of FIG. 17(A);

FIG. 27 is a perspective view of the cable with the associated cable receptacle connector of the electrical interconnection system of FIG. 26(A);

FIG. 30 is a further exploded perspective view of the cables and the associated cable receptacle connectors of the electrical interconnection system of FIG. 29(A);

DETAILED DESCRIPTION OF THE PREFERRED EMBODIMENT

Figure 1A:
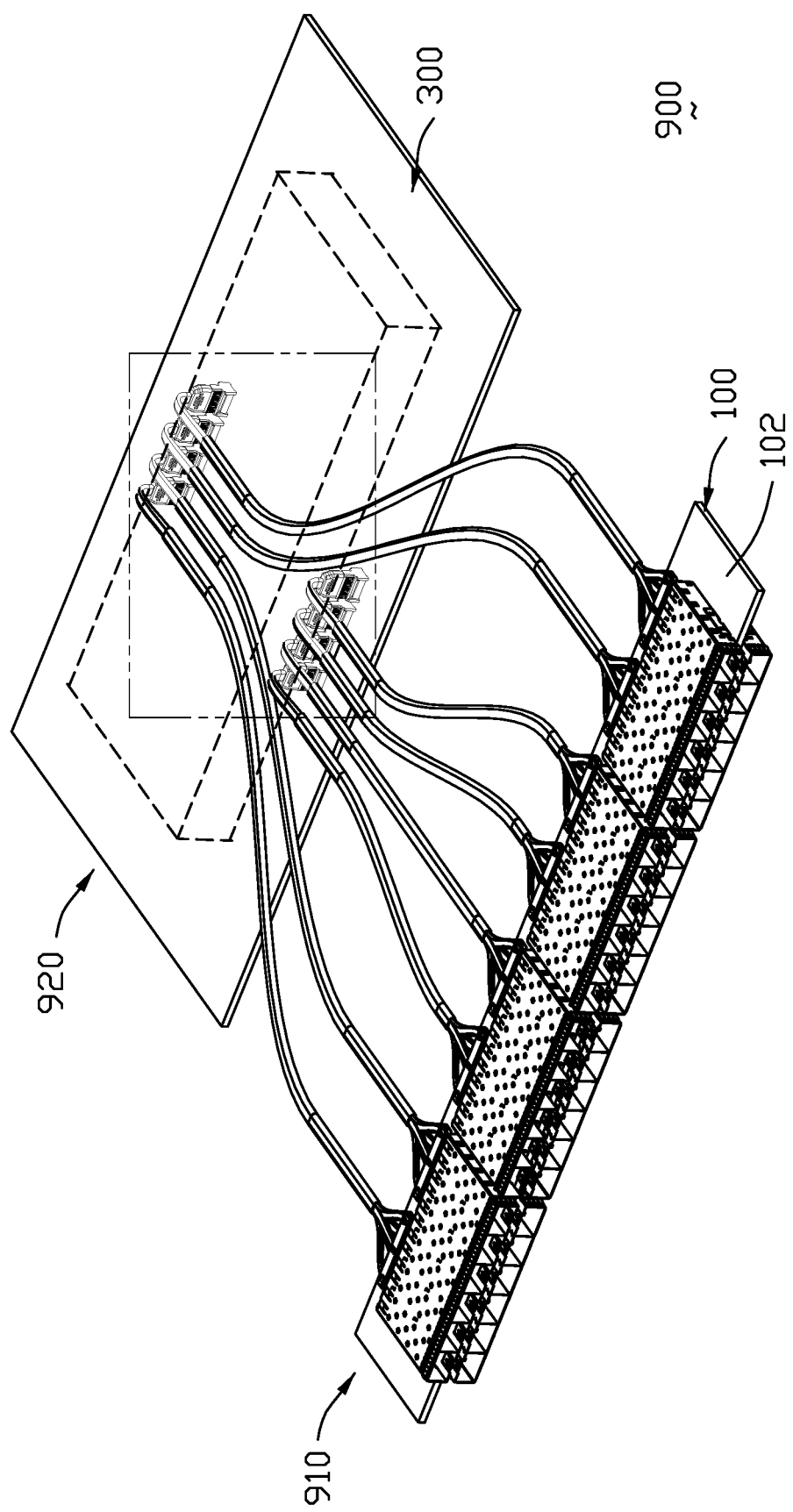
FIG. 1(A) is a perspective view of an electrical assembly or interconnection system according to the invention.
Figure 1B:
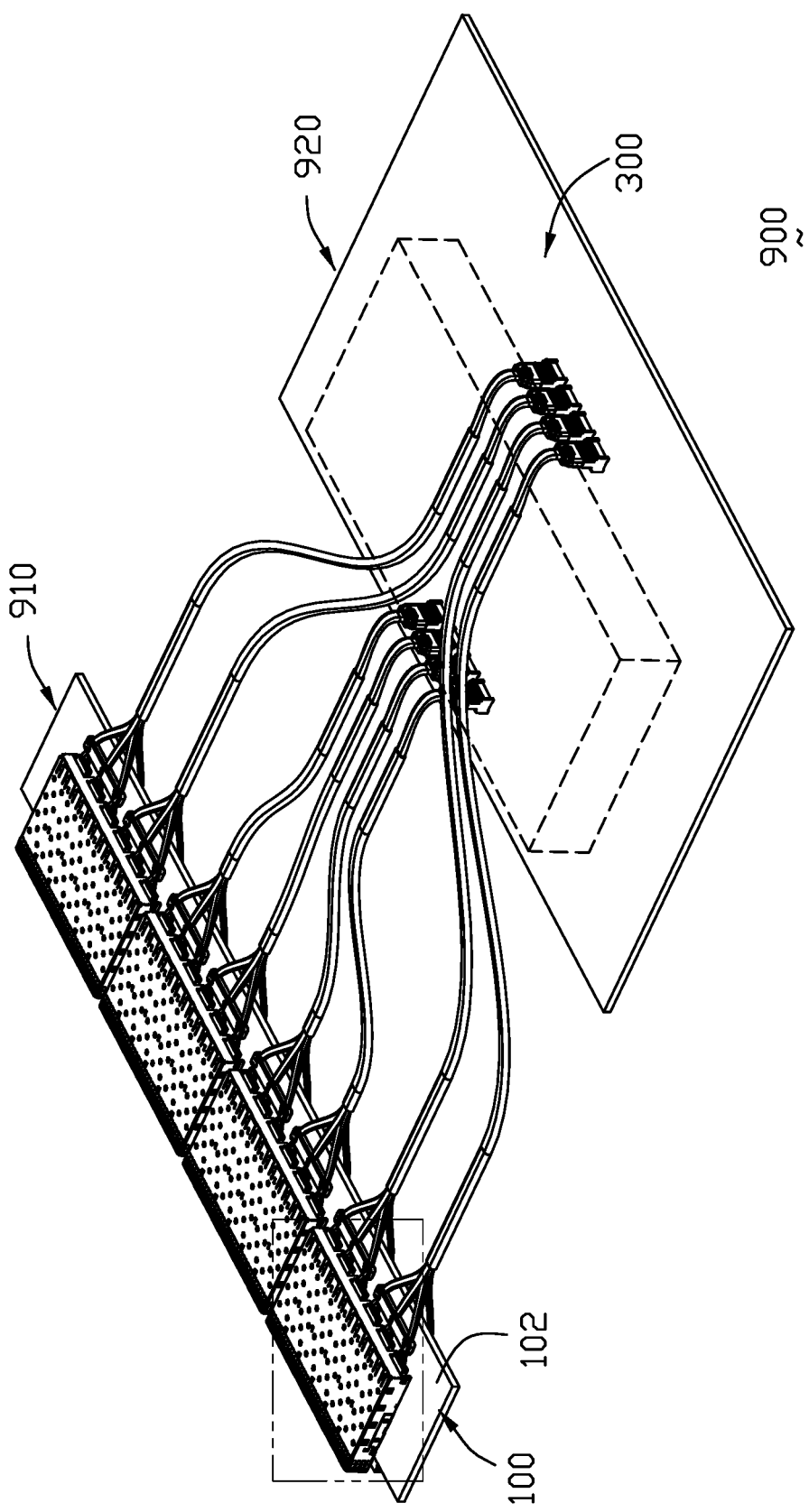
FIG. 1(B) is another perspective view of the electrical interconnection system of FIG. 1(A)
Figure 1C:
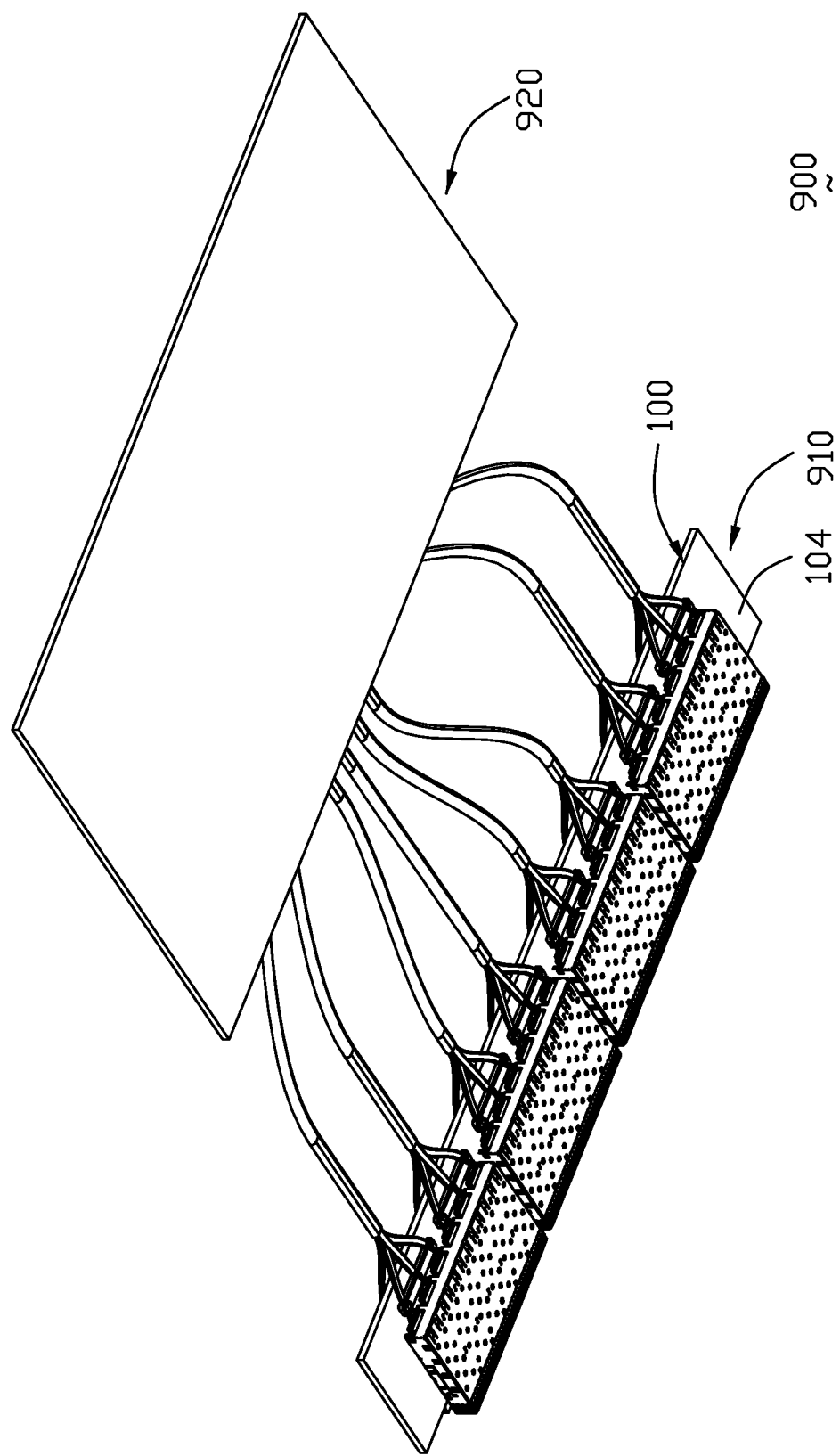
FIG. 1(C) is another perspective view of the electrical interconnection system of FIG. 1(A)
Figure 1D:
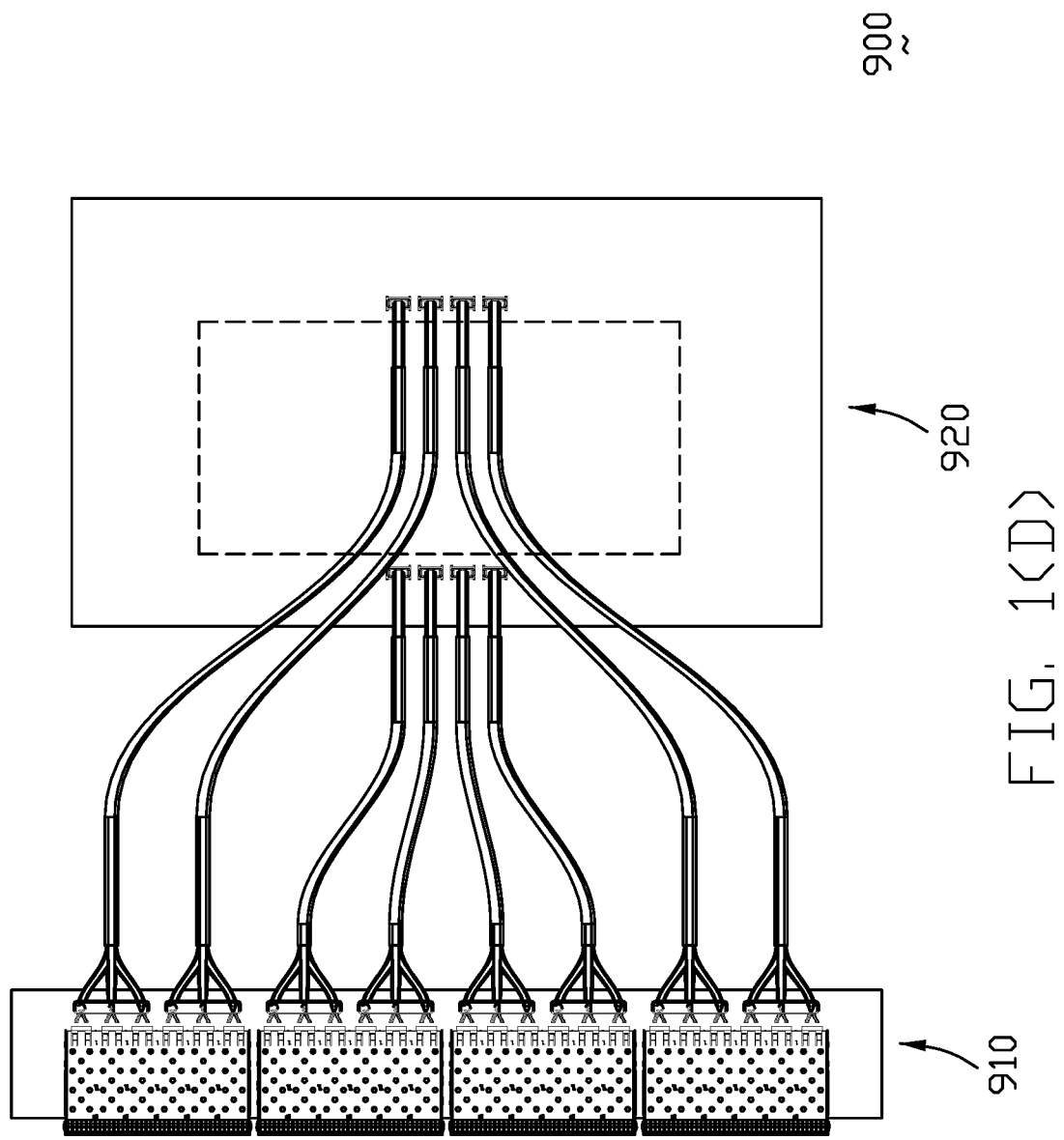
FIG. 1(D) is a top view of the electrical interconnection system of FIG. 1(A)
Figure 1E:
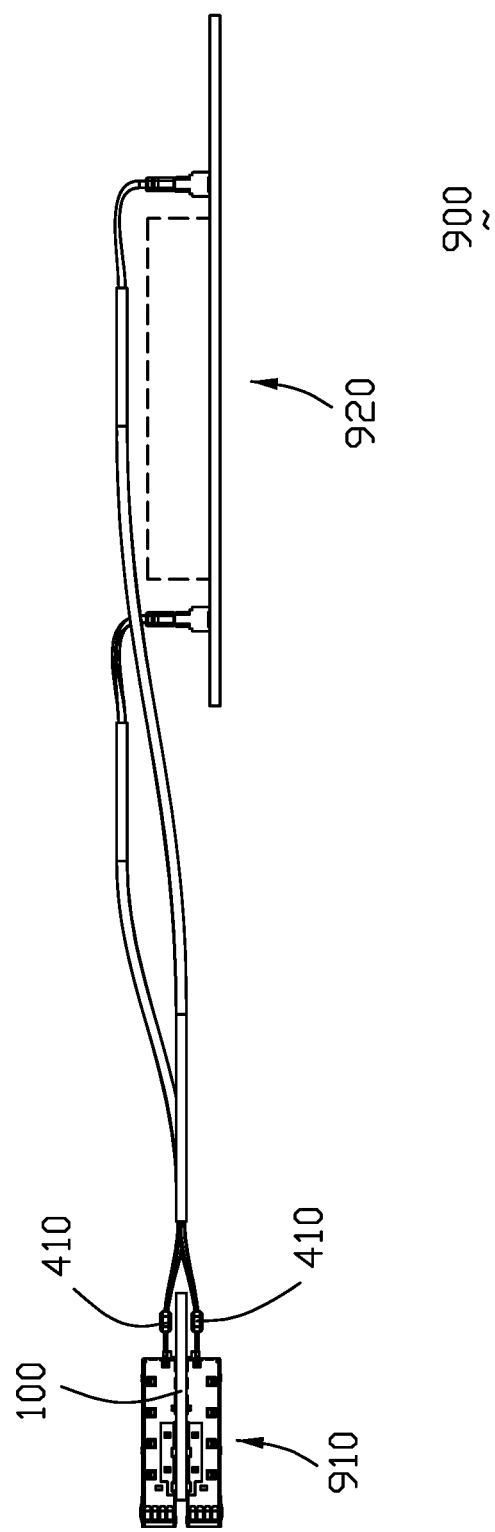
FIG. 1(E) is a side view of the electrical interconnection system of FIG. 1(A)
Figure 1F:
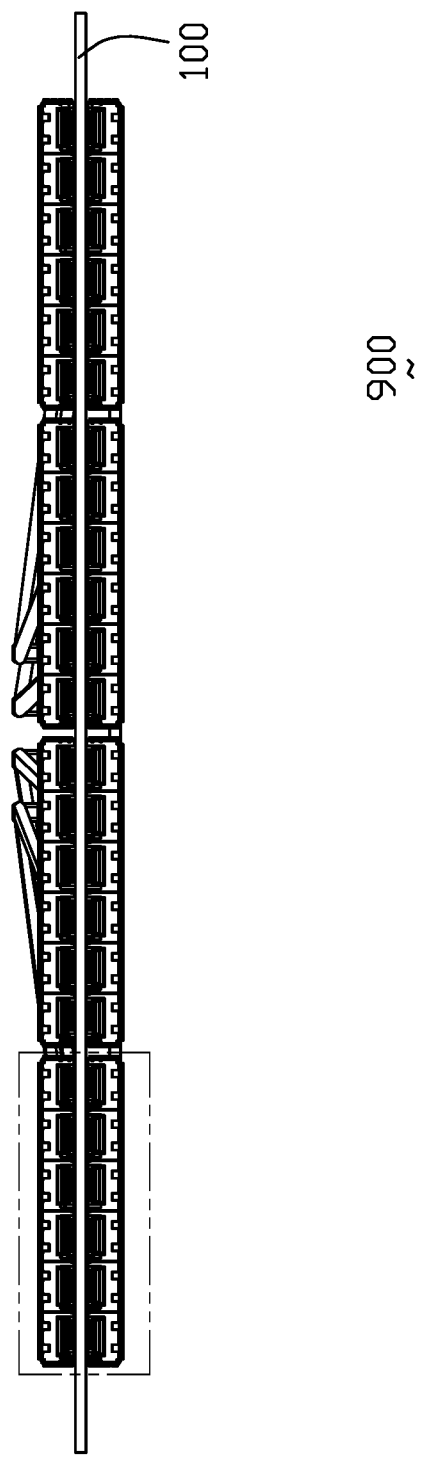
FIG. 1(F) is a front view of the electrical interconnection system of FIG. 1(A)
Figure 2:
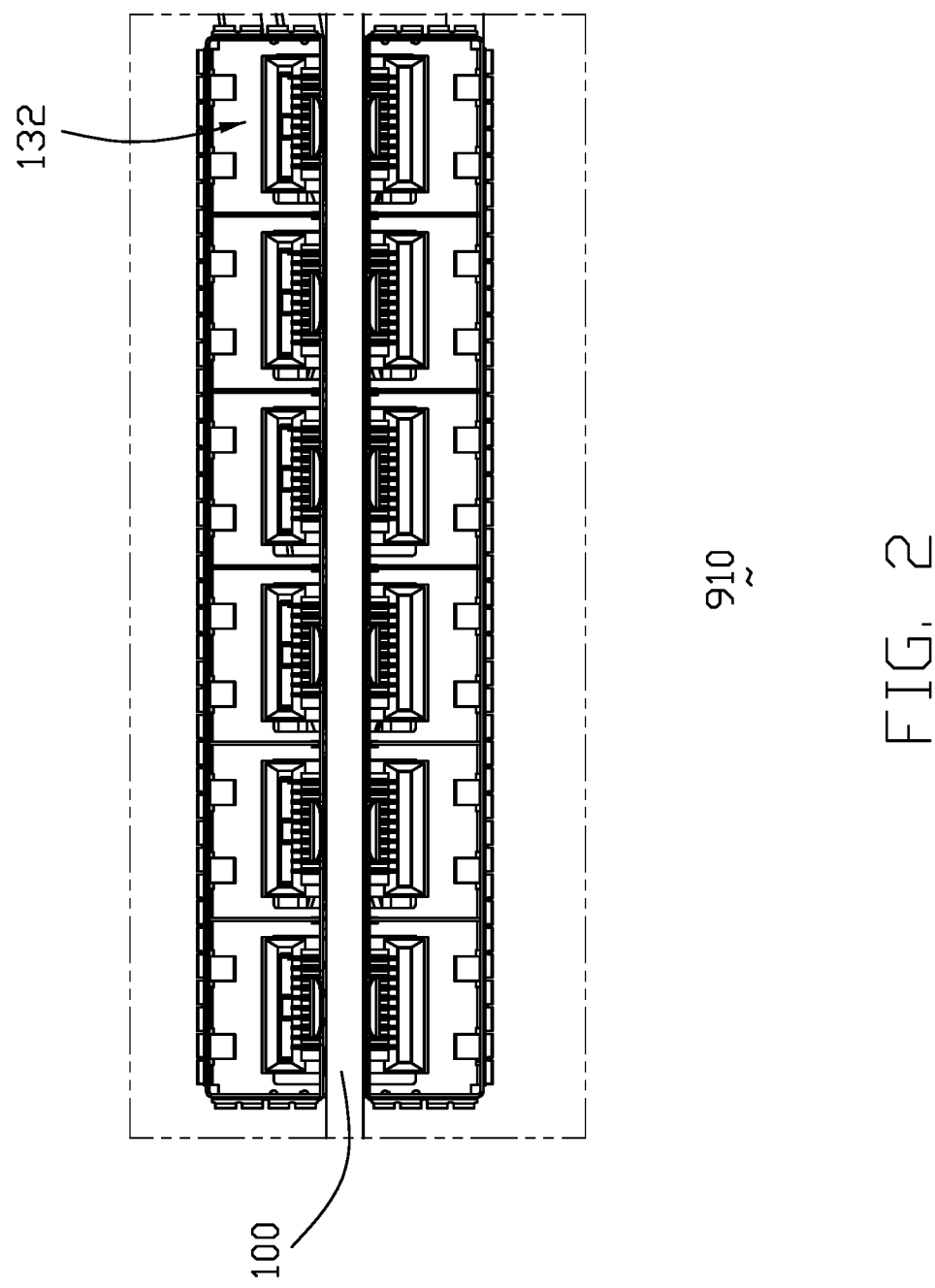
FIG. 2 is an enlarged front view of a part of the electrical interconnection system of FIG. 1(F) to show one upper cage and one lower cage with the printed circuit board.
Figure 3:
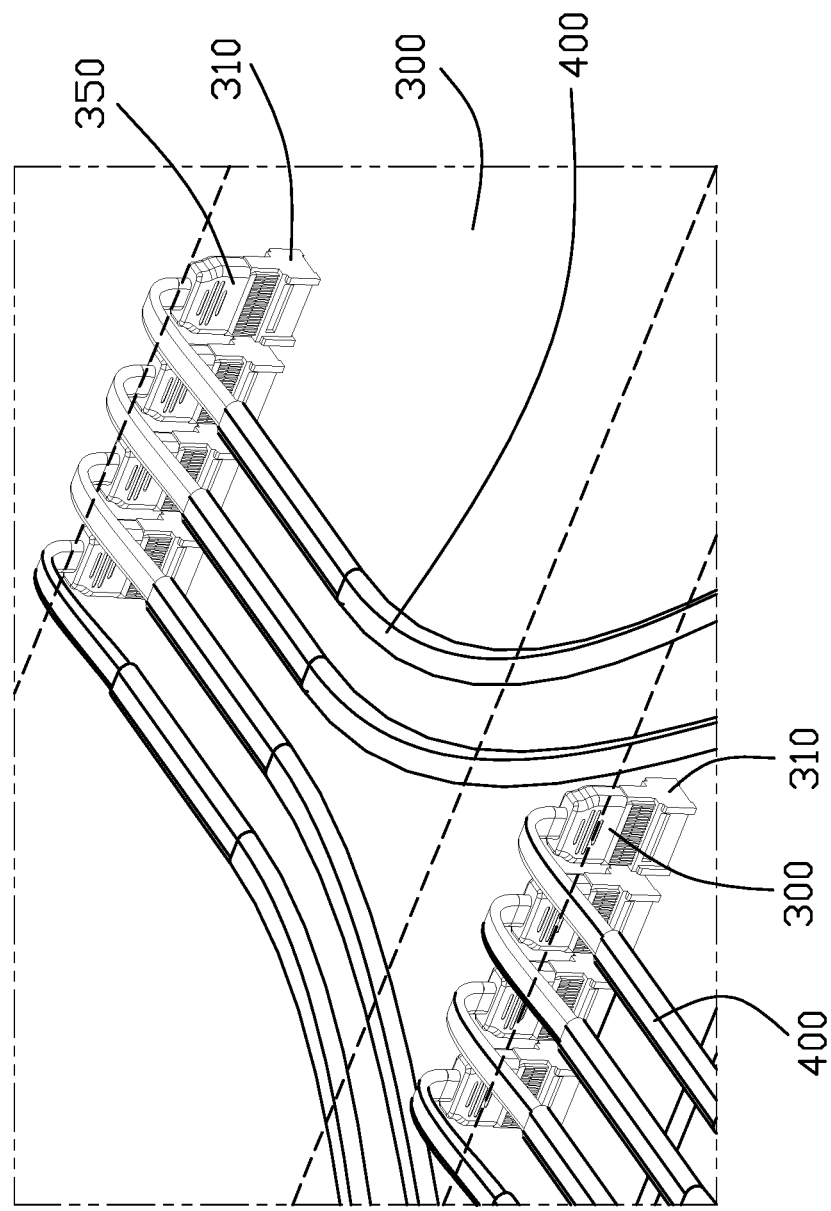
FIG. 3 is an enlarged perspective view of a part of the electrical interconnection system of FIG. 1(A) to show the cables and the corresponding board-mount receptacle connectors coupled therewith.
Figure 4:
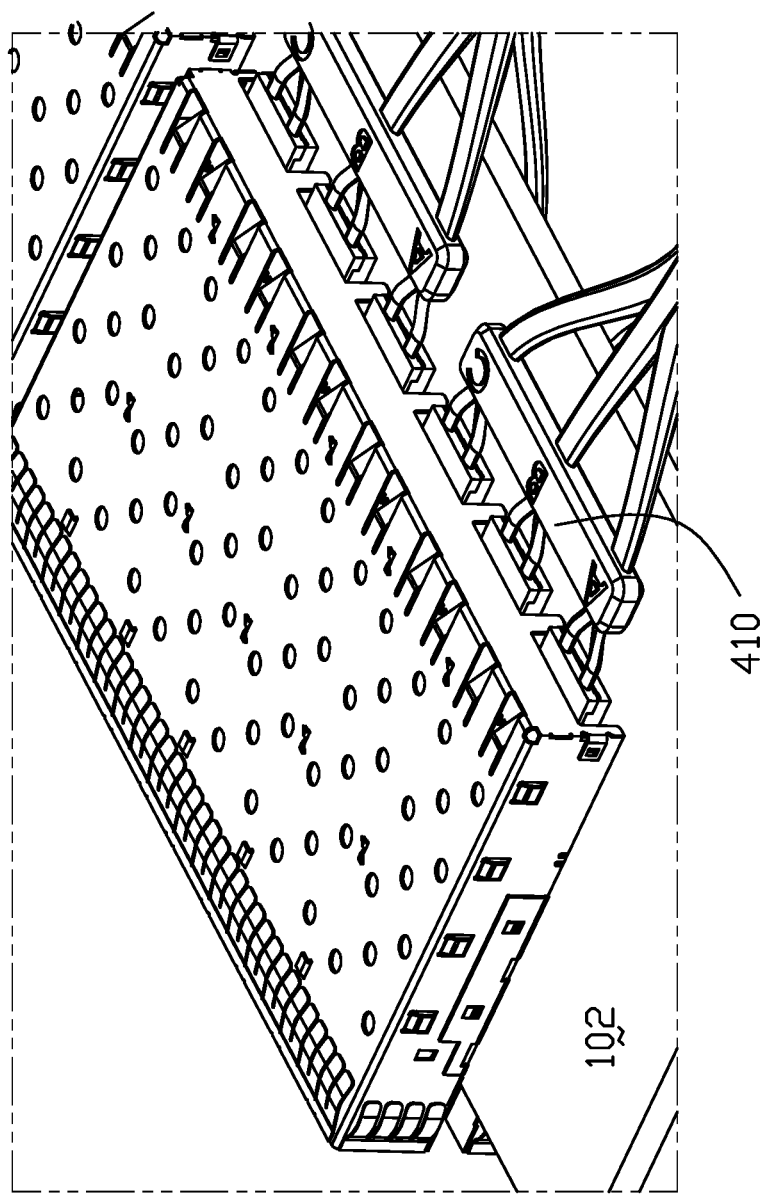
FIG. 4 is an enlarged perspective view of a portion of the periphery side of the electrical interconnection system of FIG. 1(B) to show how the cables are connected to the corresponding cable receptacle connectors, respectively.
Figure 5A:
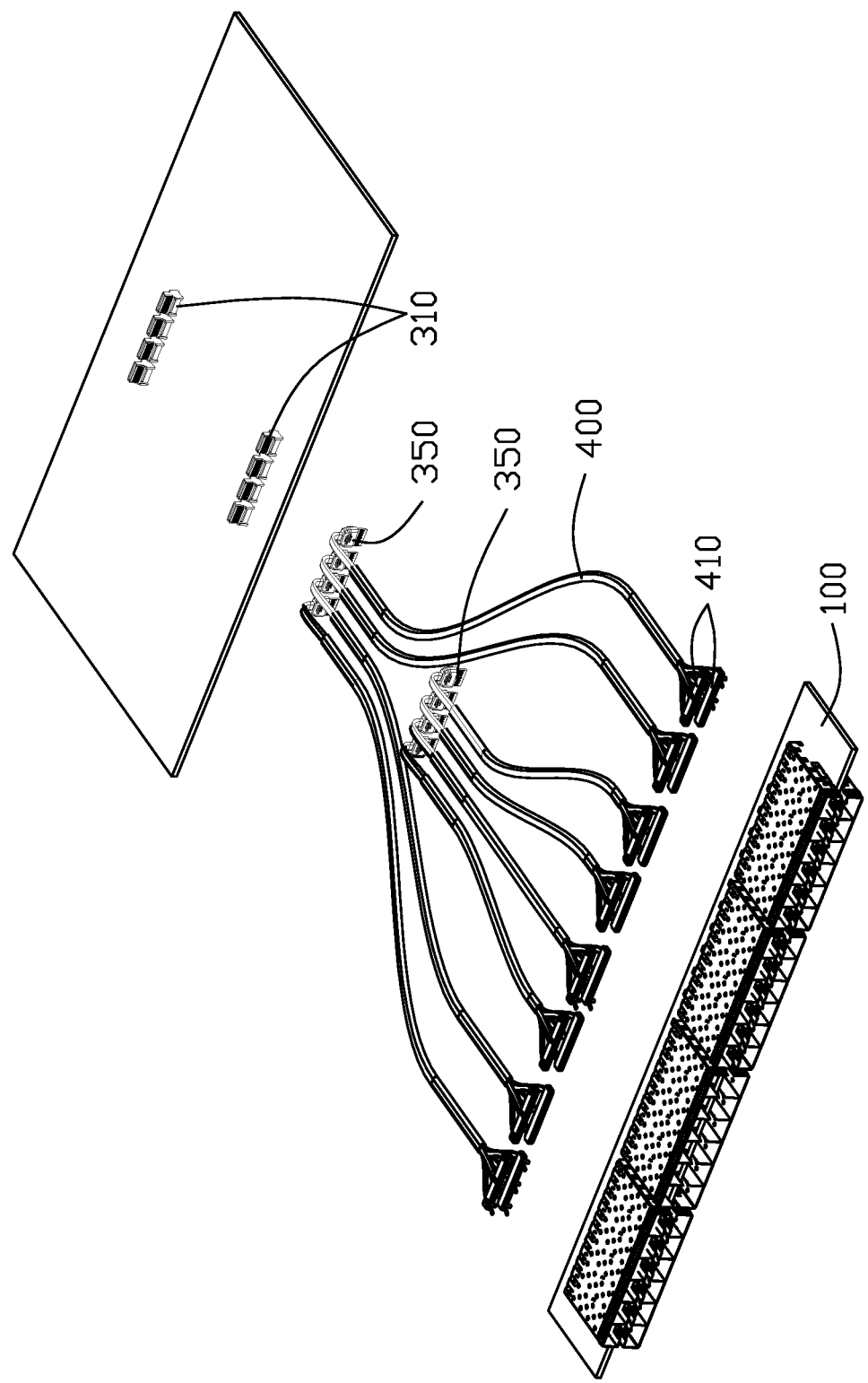
FIG. 5(A) is an exploded perspective view of the electrical interconnection system of FIG. 1(A)
Figure 5B:
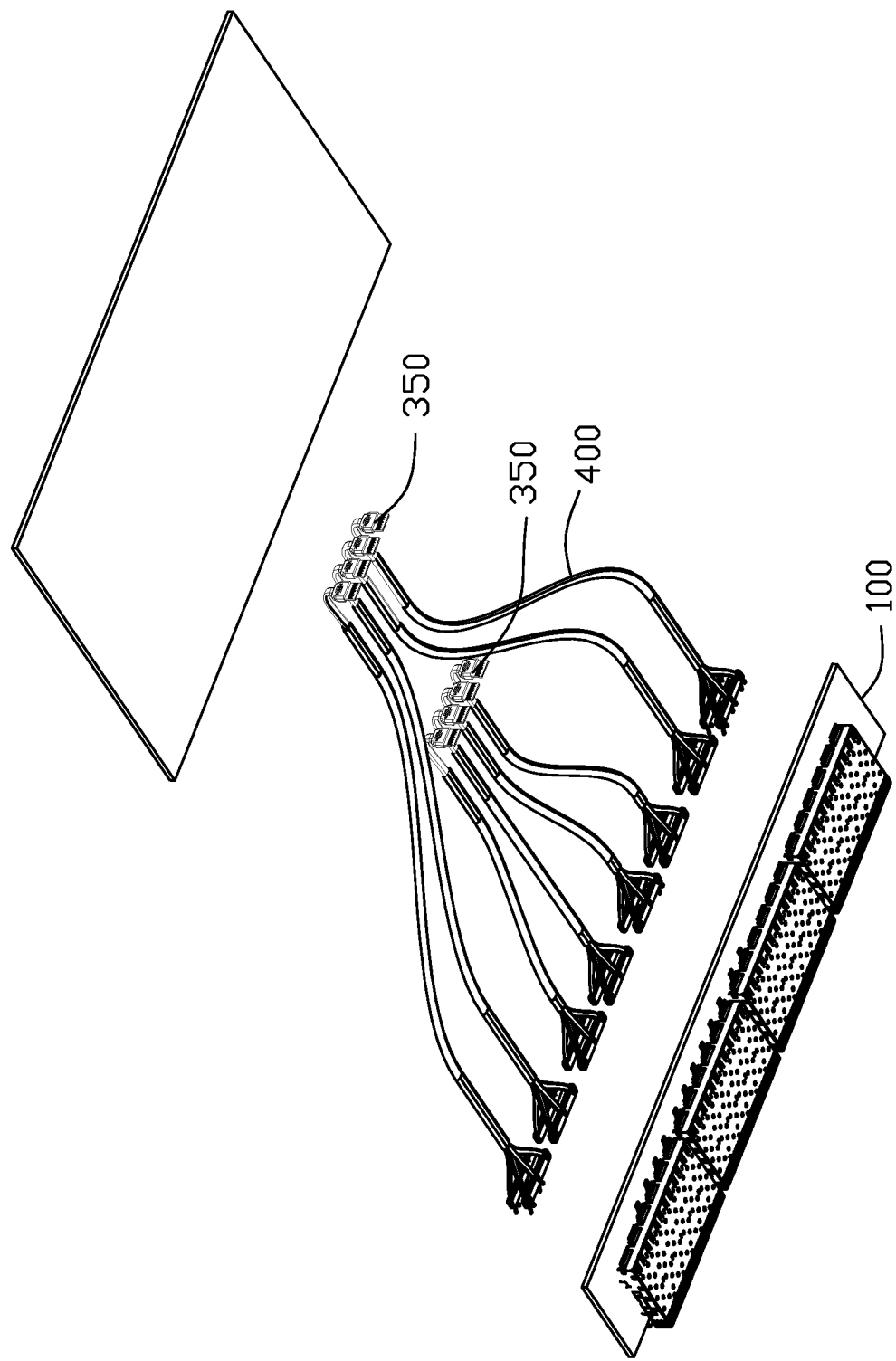
FIG. 5(B) is another exploded perspective view of the electrical interconnection system of FIG. 5(A)
Figure 6:
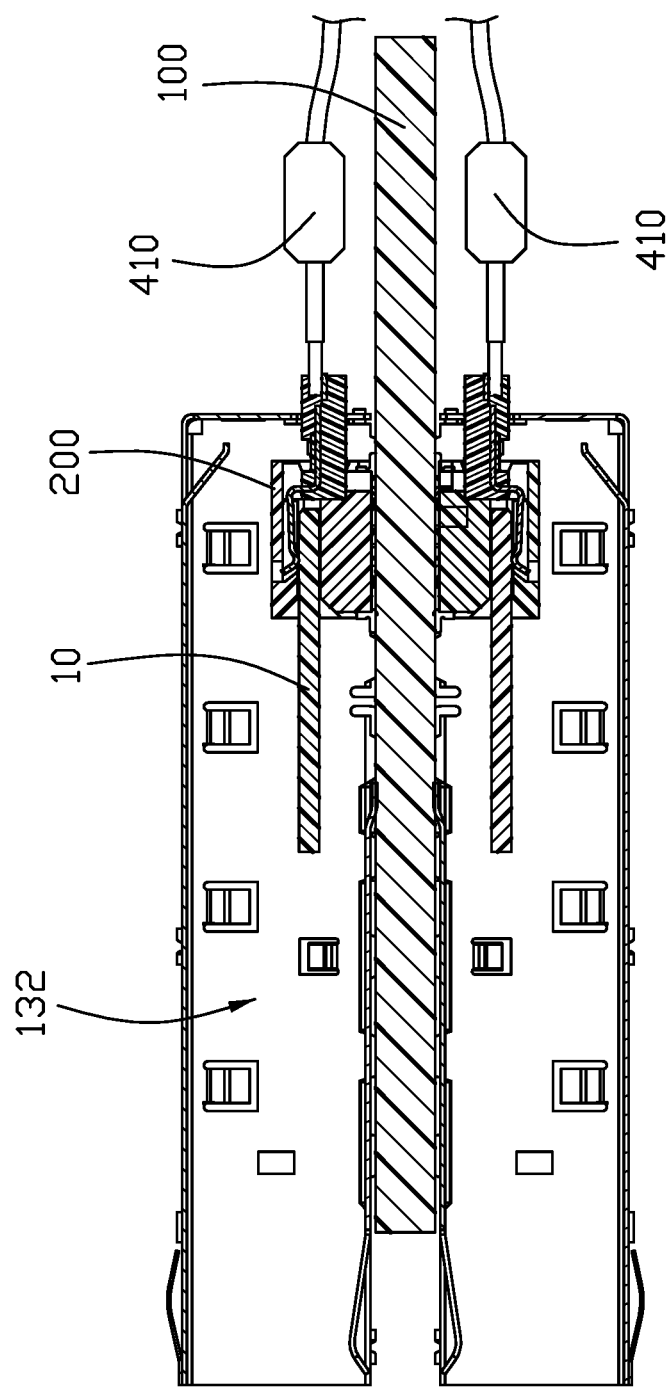
FIG. 6 is a cross-sectional view of the periphery side of the electrical interconnection system of FIG. 1(A)
Figure 7:
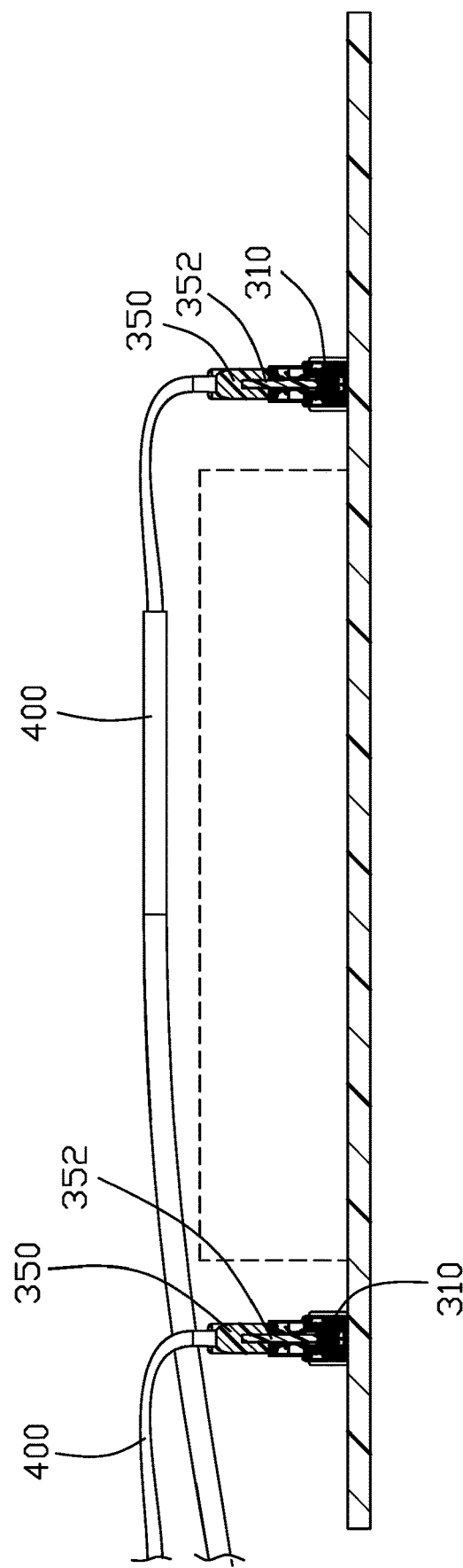
FIG. 7 is a cross-sectional view of the system side of the electrical interconnection system of FIG. 1(A)
Figure 8A:
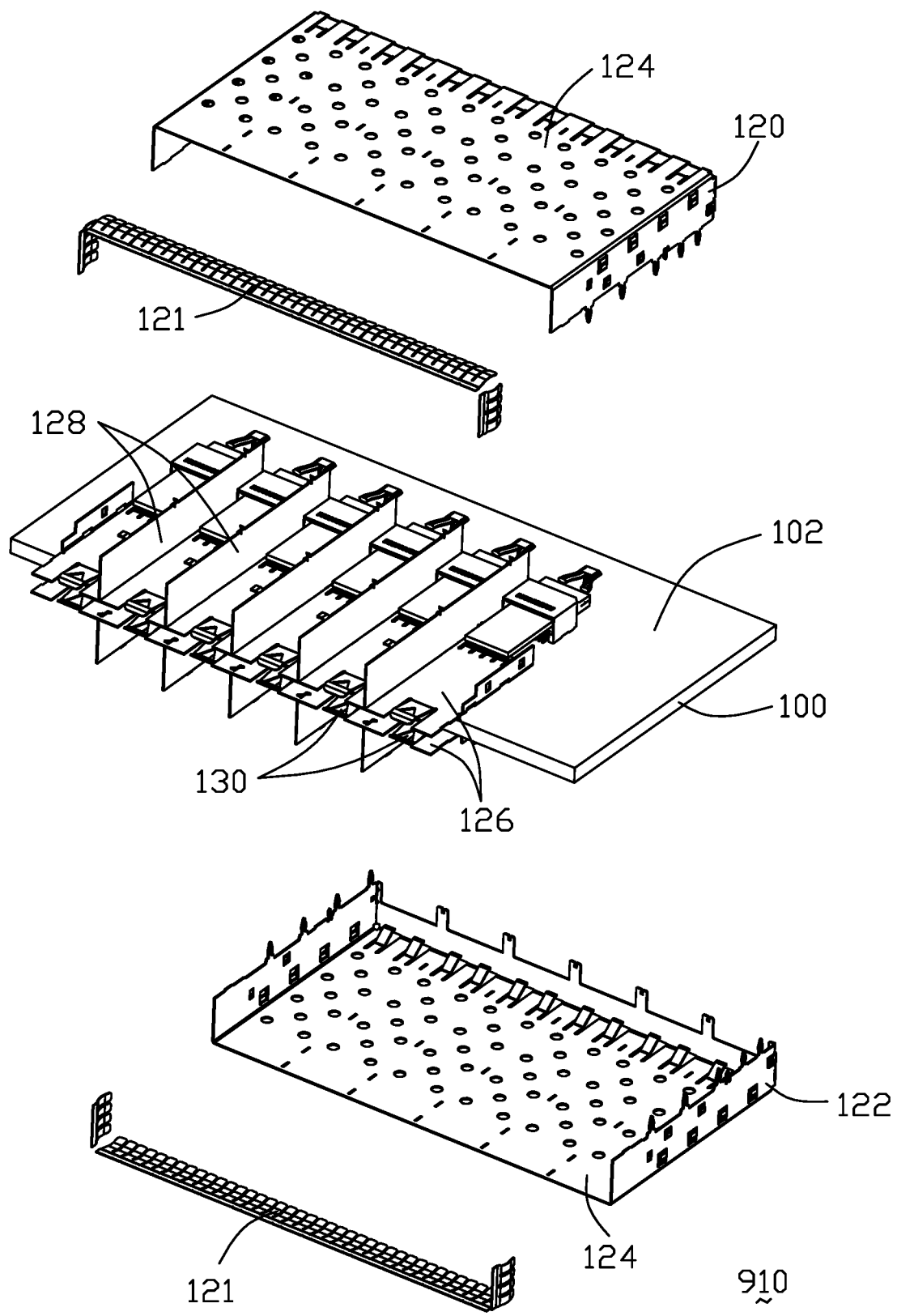
FIG. 8(A) is an exploded perspective view of the periphery side of the electrical interconnection system of FIG. 1(A)
Figure 8B:
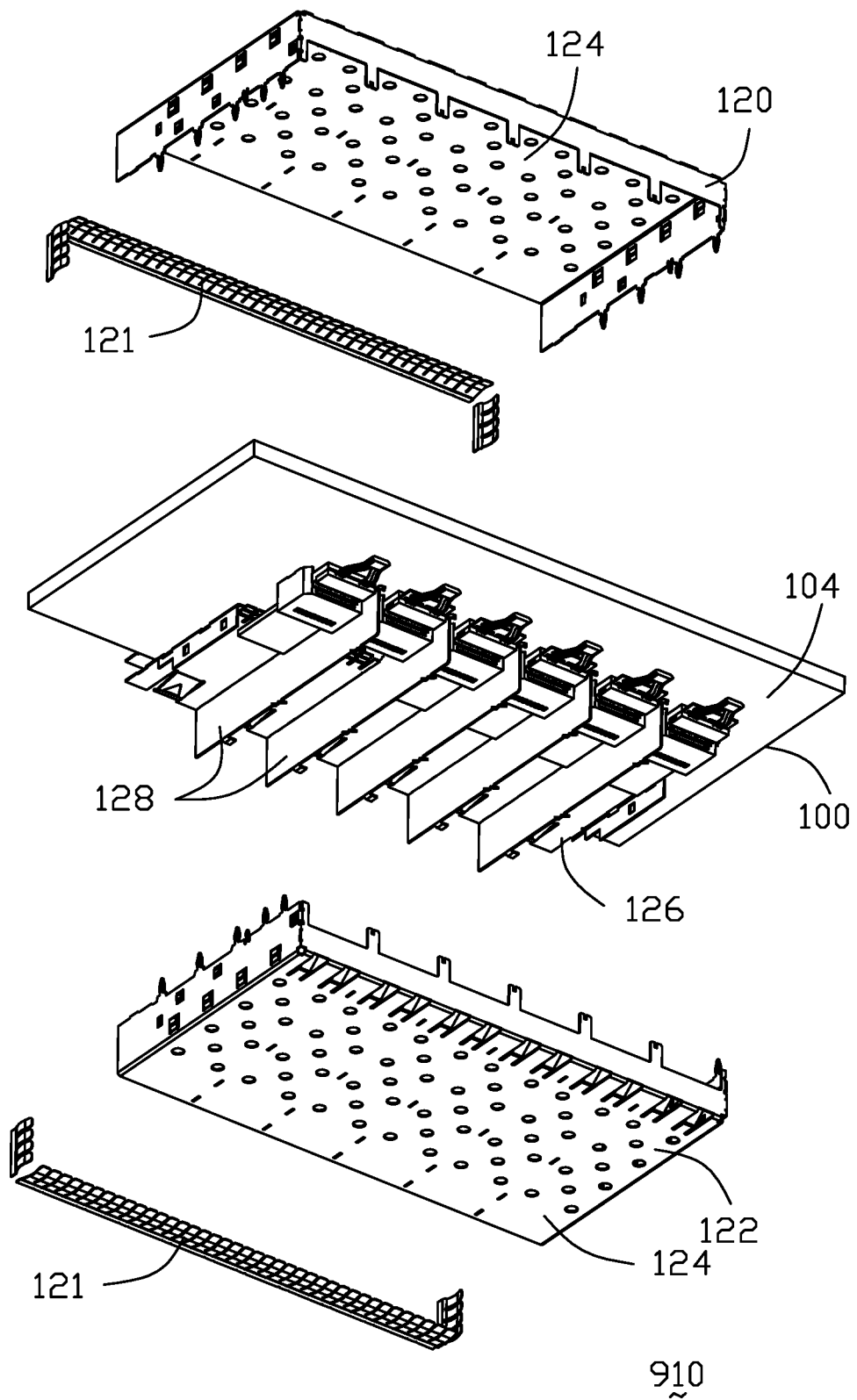
FIG. 8(B) is another exploded perspective view of the system side of the electrical interconnection system of FIG. 8(A)
Figure 9:
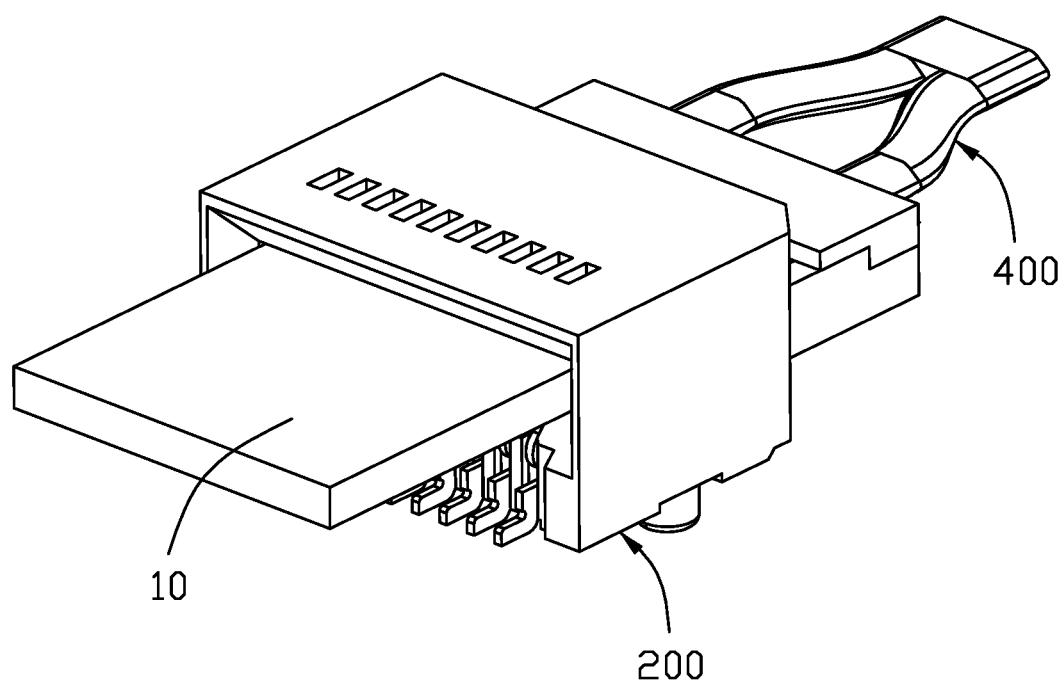
FIG. 9 is a perspective view of the cable receptacle connector of the system side of the electrical interconnecting system of FIG. 1(A) with the mating tongue of the SFP module inserted thereinto and with the associated cable.
Figure 10:
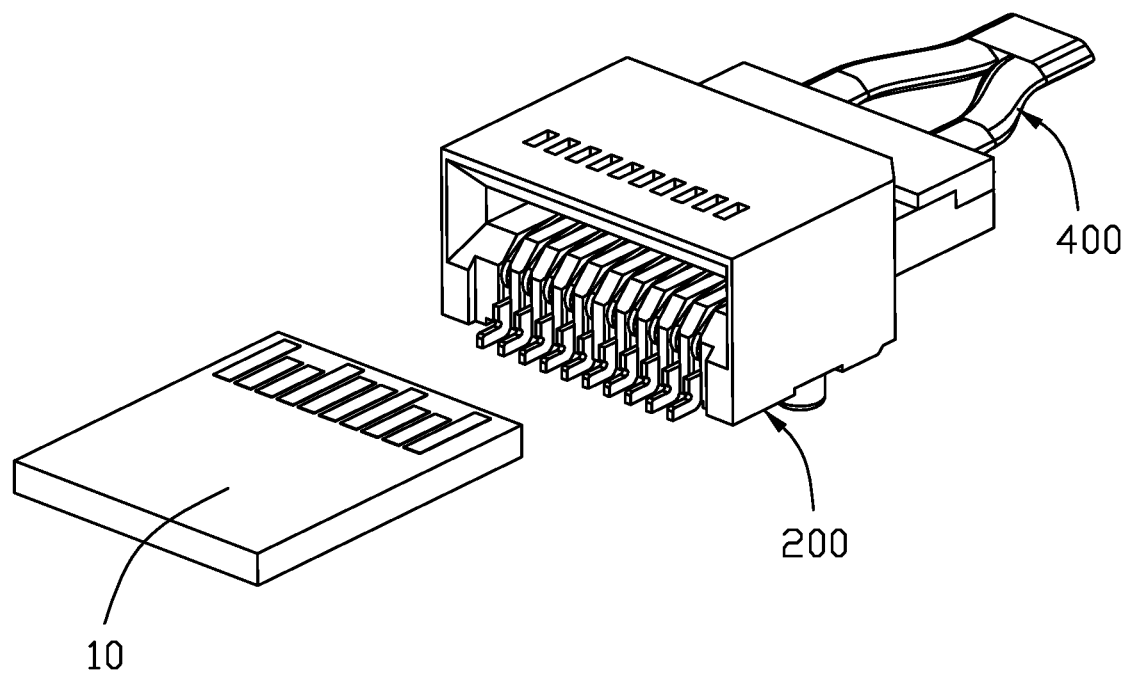
FIG. 10 is a perspective view of the cable receptacle connector with the removed mating tongue of the corresponding SFP module and with the associated cable of the electrical interconnection system of FIG. 9.
Figure 11A:
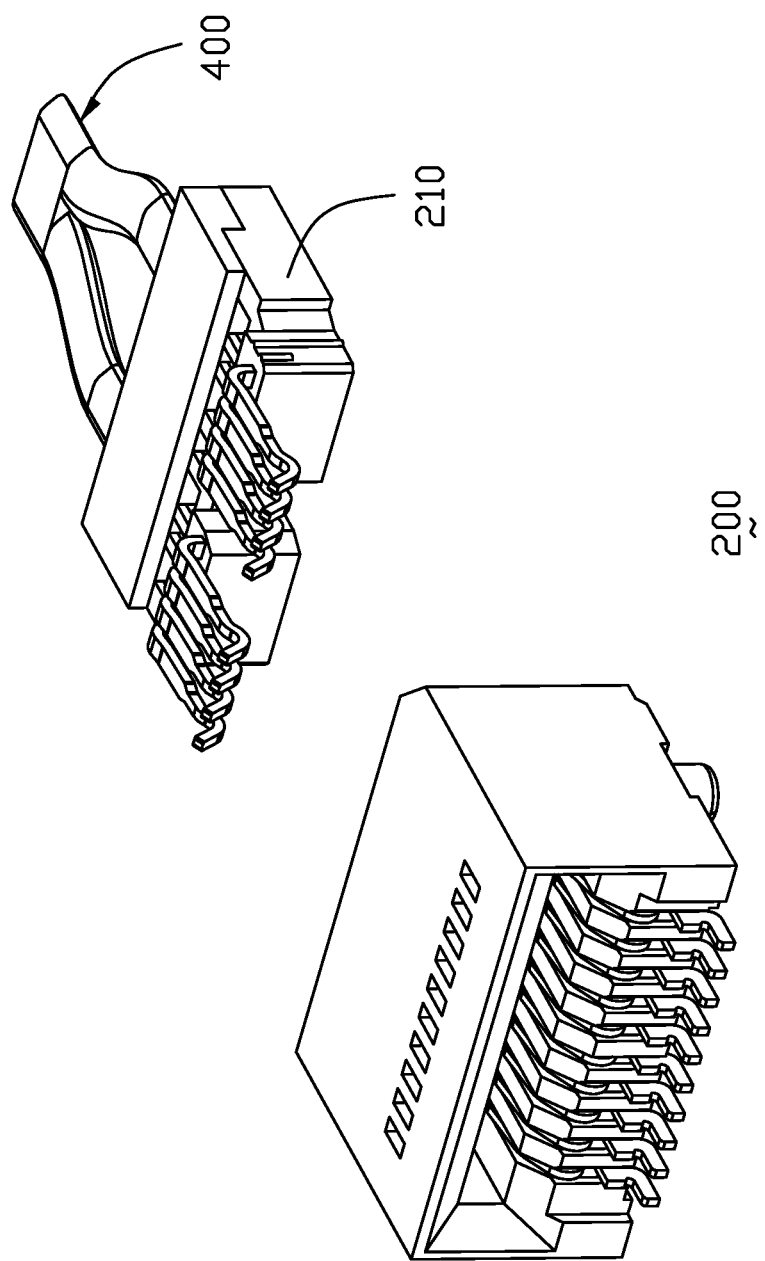
FIG. 11(A) is an exploded perspective view of the cable receptacle connector with the associated cable of the electrical interconnection system of FIG. 10.
Figure 11B:
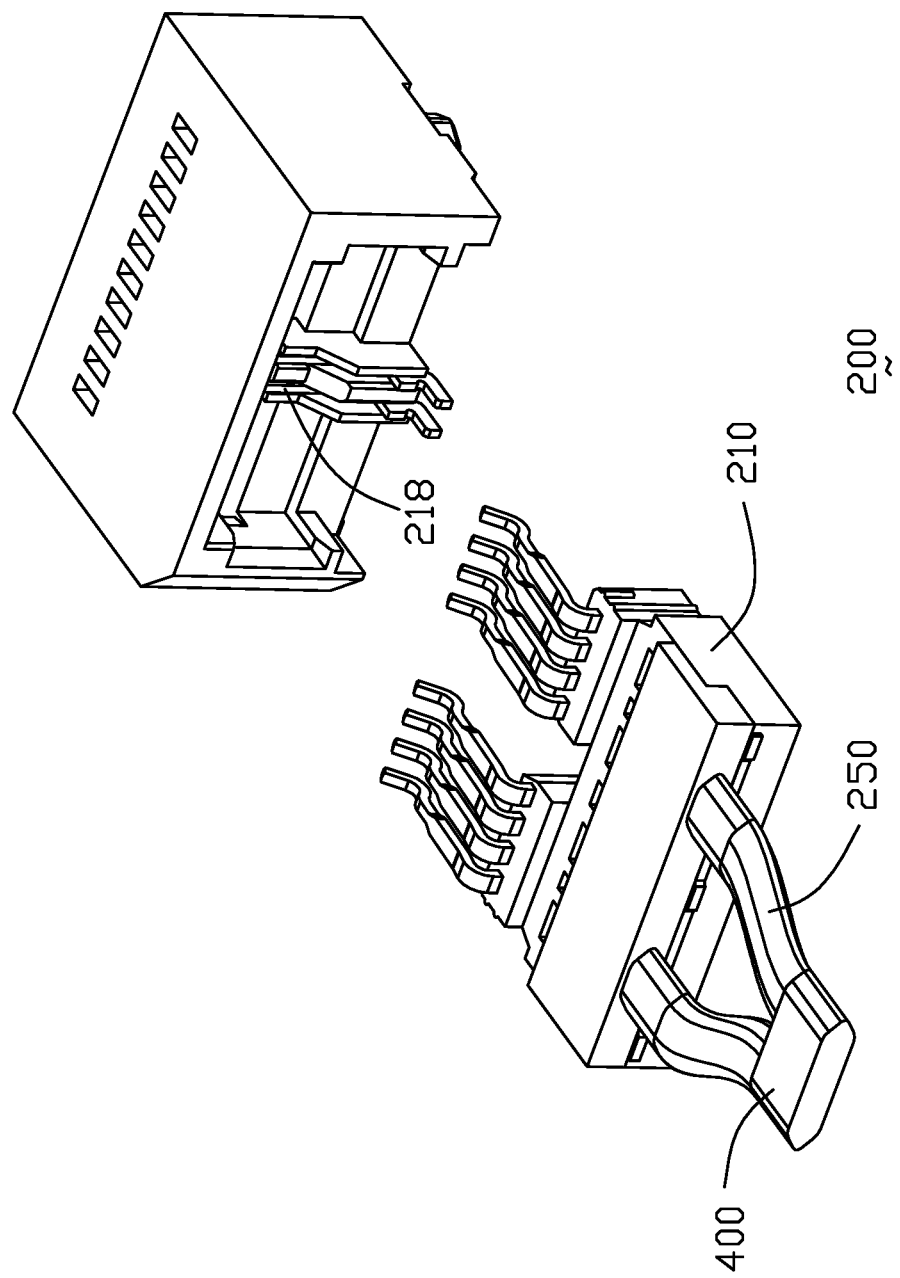
FIG. 11(B) is another exploded perspective view of the cable receptacle connector with the associated cable of the electrical interconnection system of FIG. 11(A)
Figure 11C:
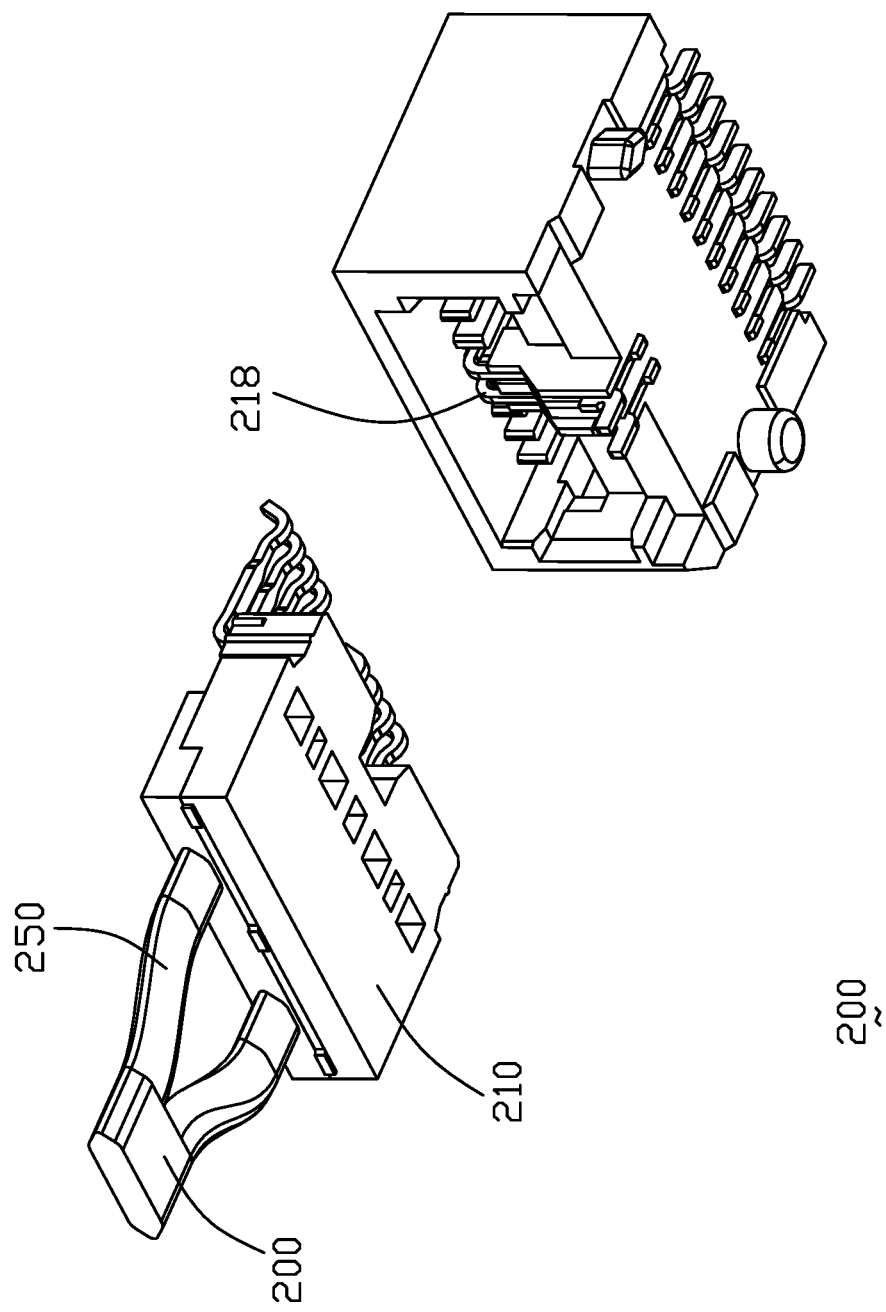
FIG. 11(C) is another exploded perspective view of the cable receptacle connector with the associated cable of the electrical interconnection system of FIG. 11(A)
Figure 11D:
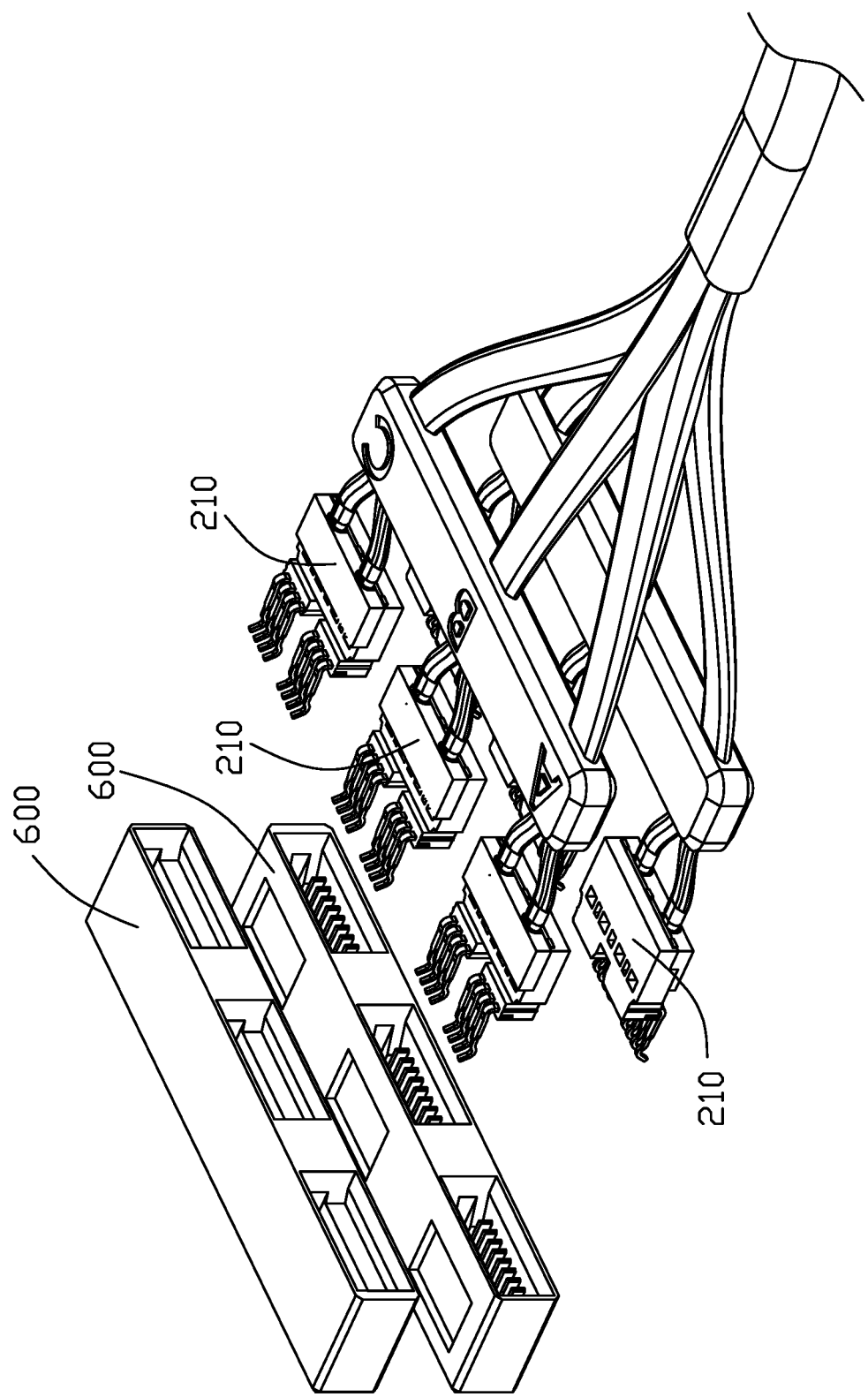
FIG. 11(D) showing the neighboring contact modules can commonly protectively be received within a same protective cover during shipping.
Figure 12A:
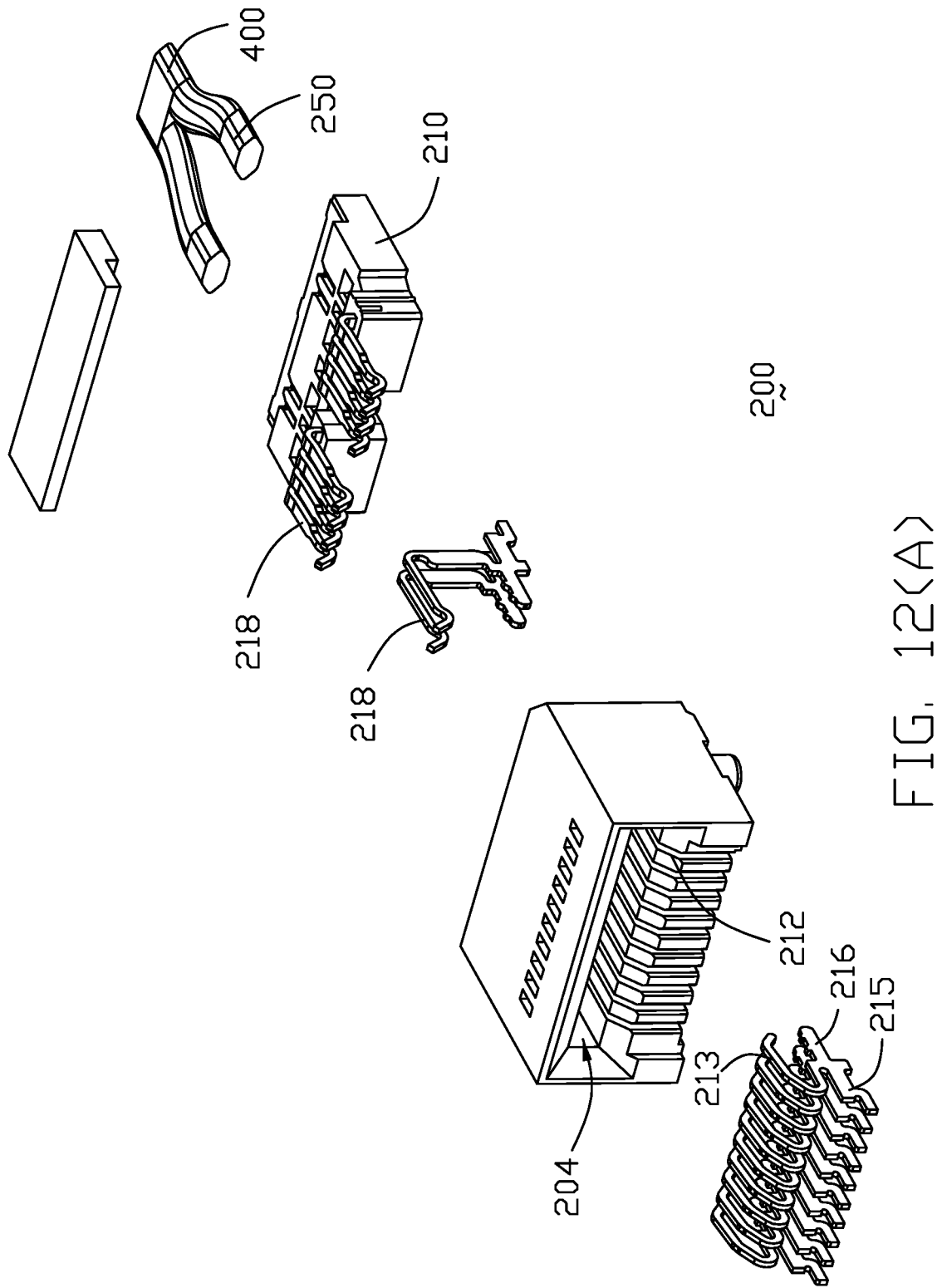
FIG. 12(A) is a further exploded perspective view of the cable receptacle connector with the associated cable of the electrical interconnection system of FIG. 11(A)
Figure 12B:
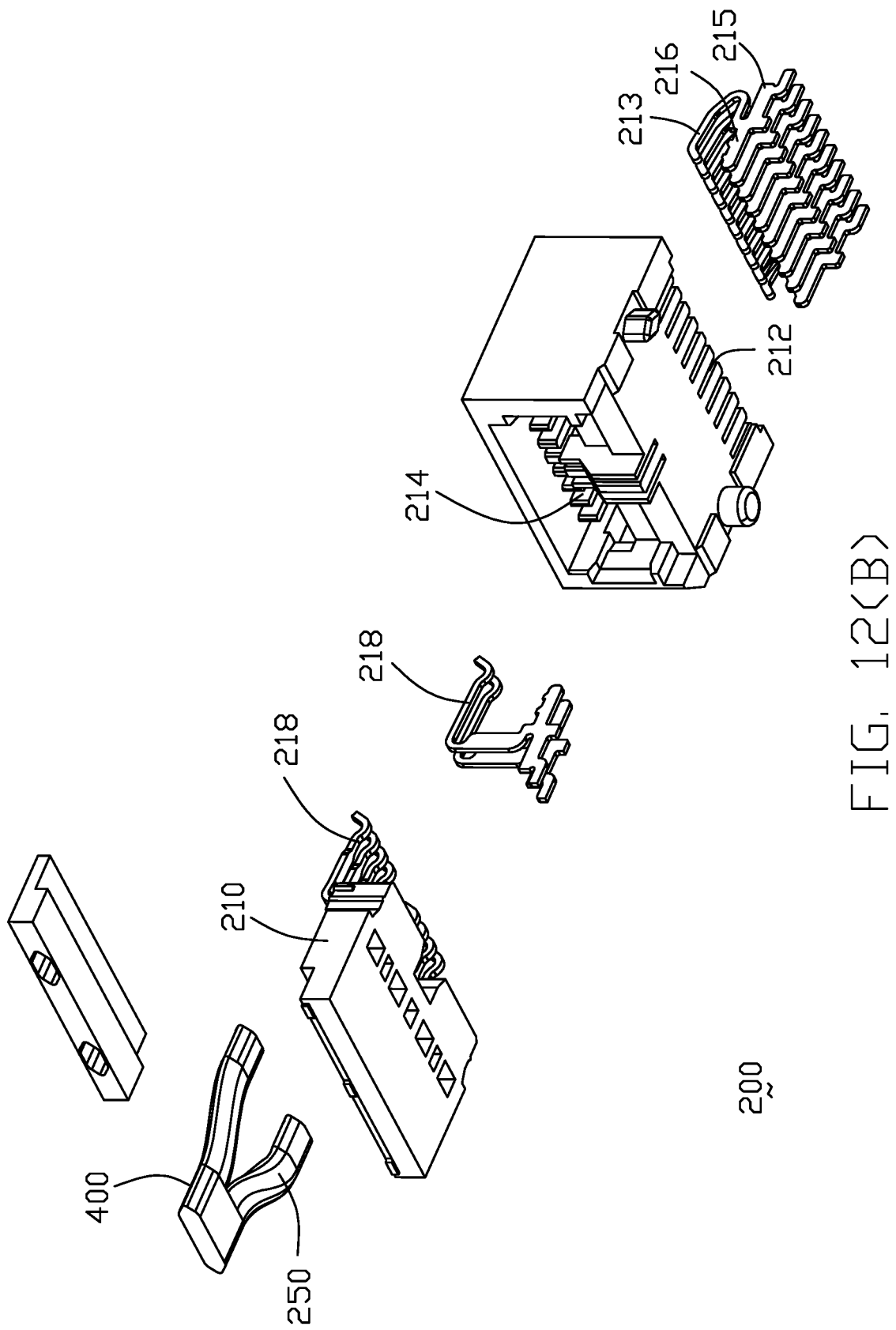
FIG. 12(B) is another further exploded perspective view of the cable receptacle connector with the associated cable of the electrical interconnection system of FIG. 12(A)
Figure 13A:
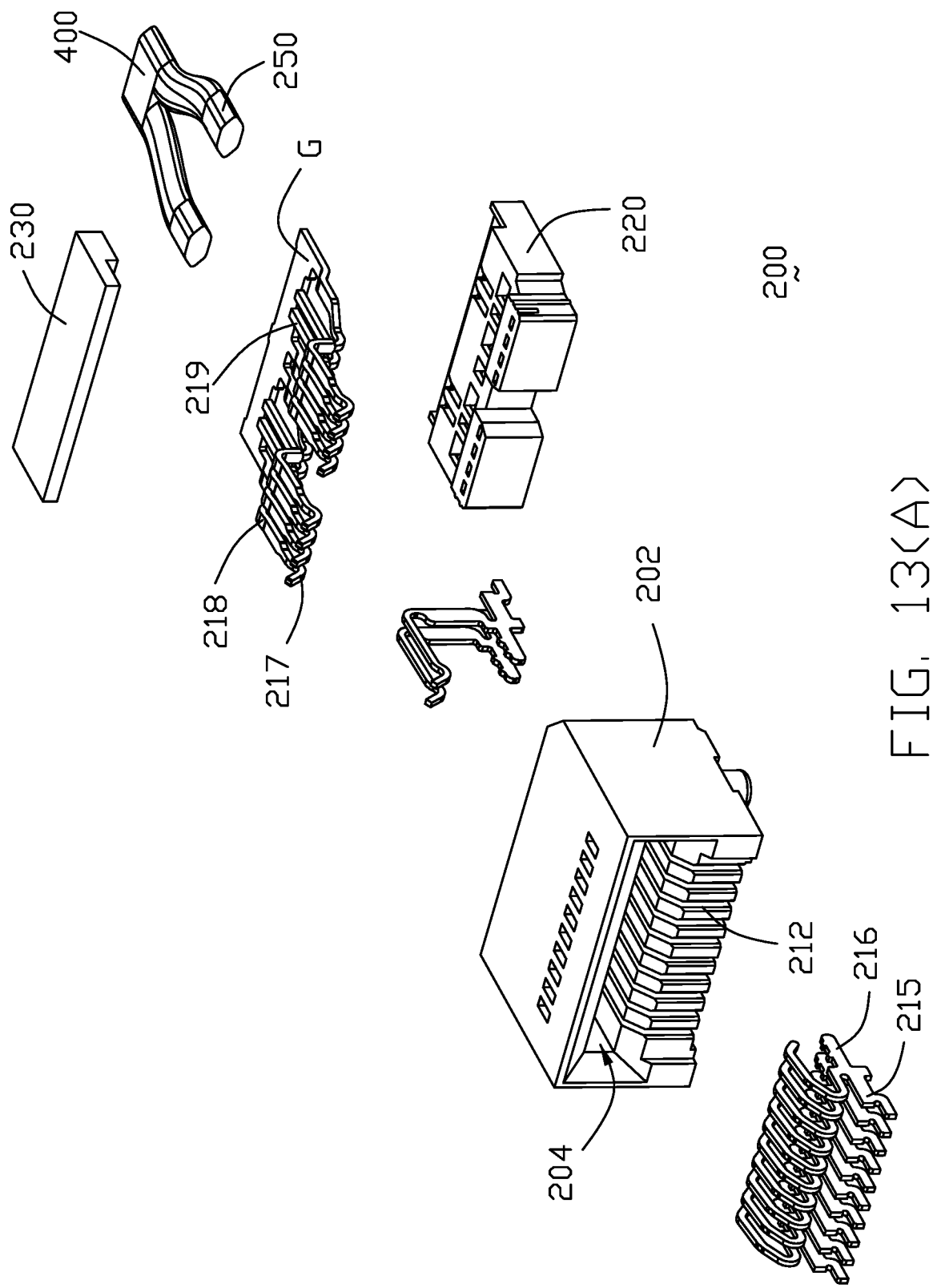
FIG. 13(A) is a further exploded perspective view of the cable receptacle connector with the associated cable of the electrical interconnection system of FIG. 12(A)
Figure 13B:
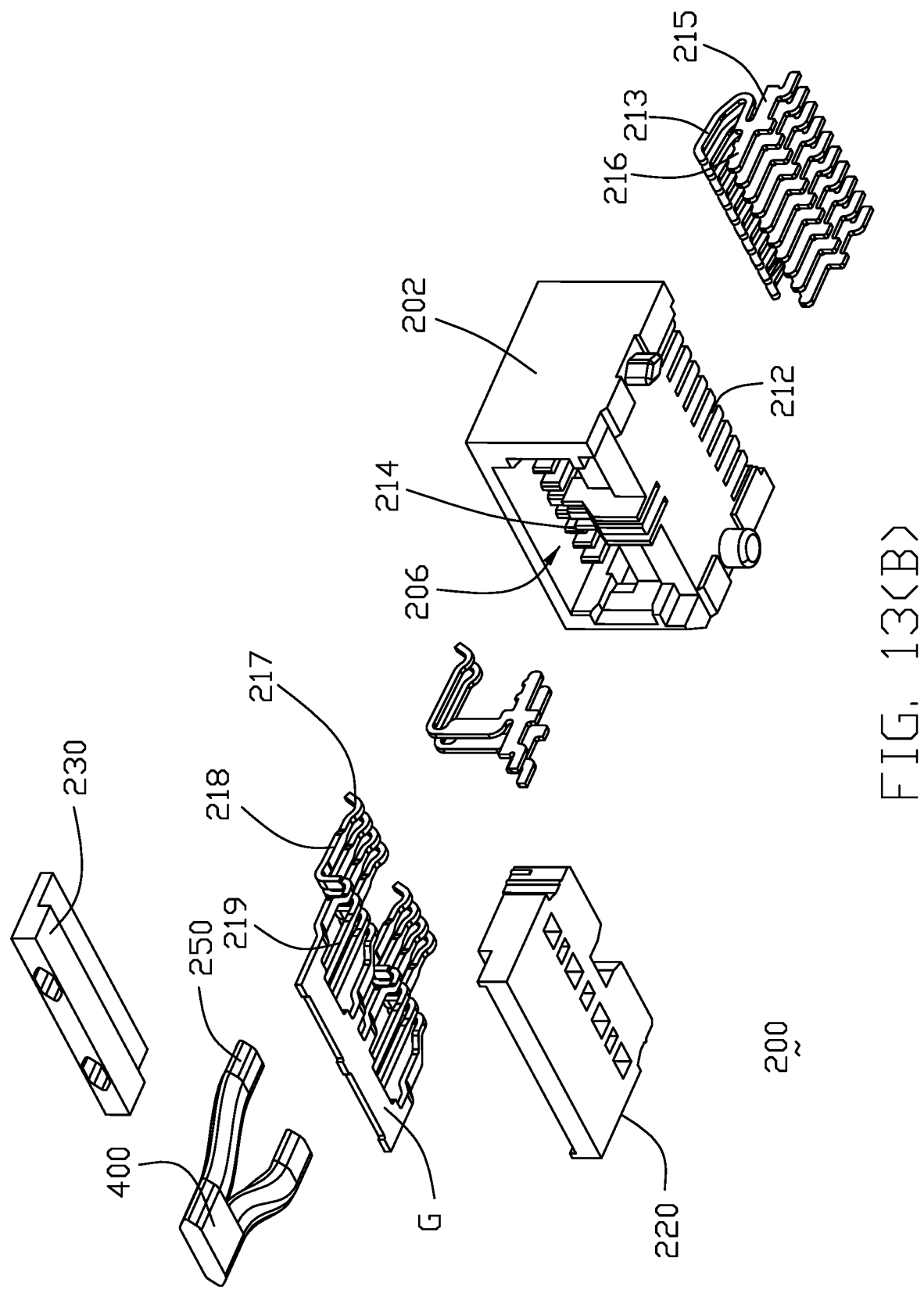
FIG. 13(B) is another further exploded perspective view of the cable receptacle connector with the associated cable of the electrical interconnection system of FIG. 13(A)
Figure 14A:
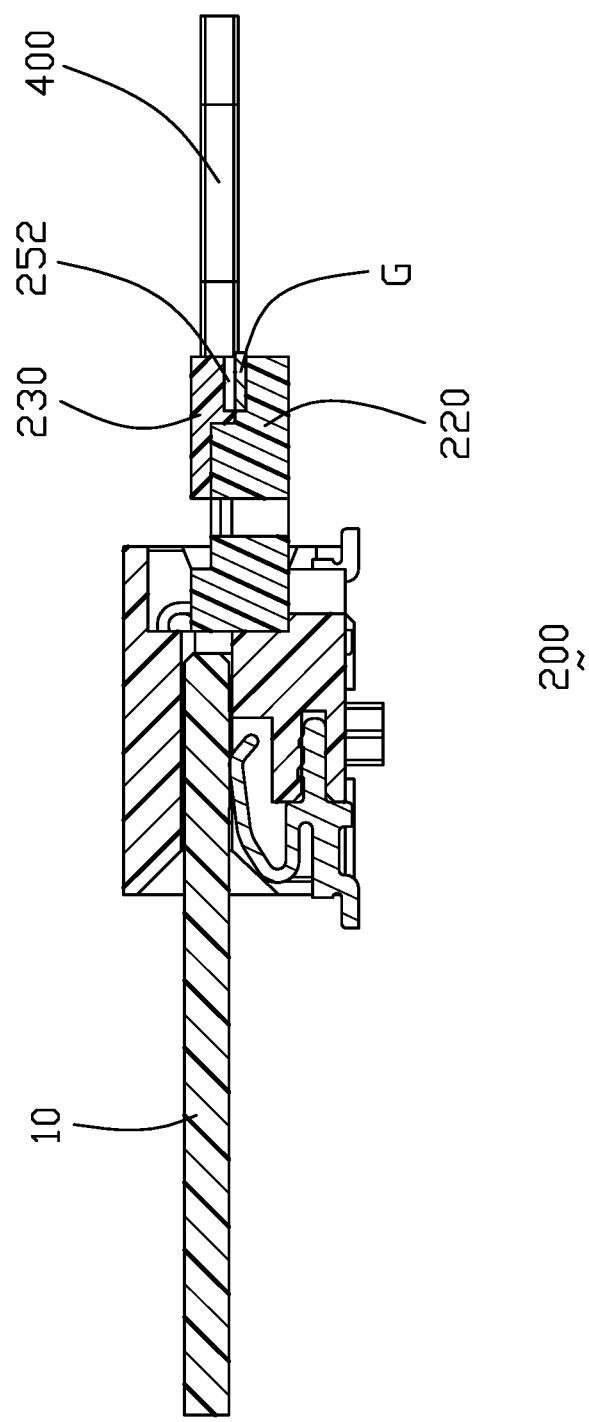
FIG. 14(A) is a cross-sectional view of the cable receptacle connector with the inserted mating tongue of the SFP module and with the associated cable of the electrical interconnection system of FIG. 9.
Figure 14B:
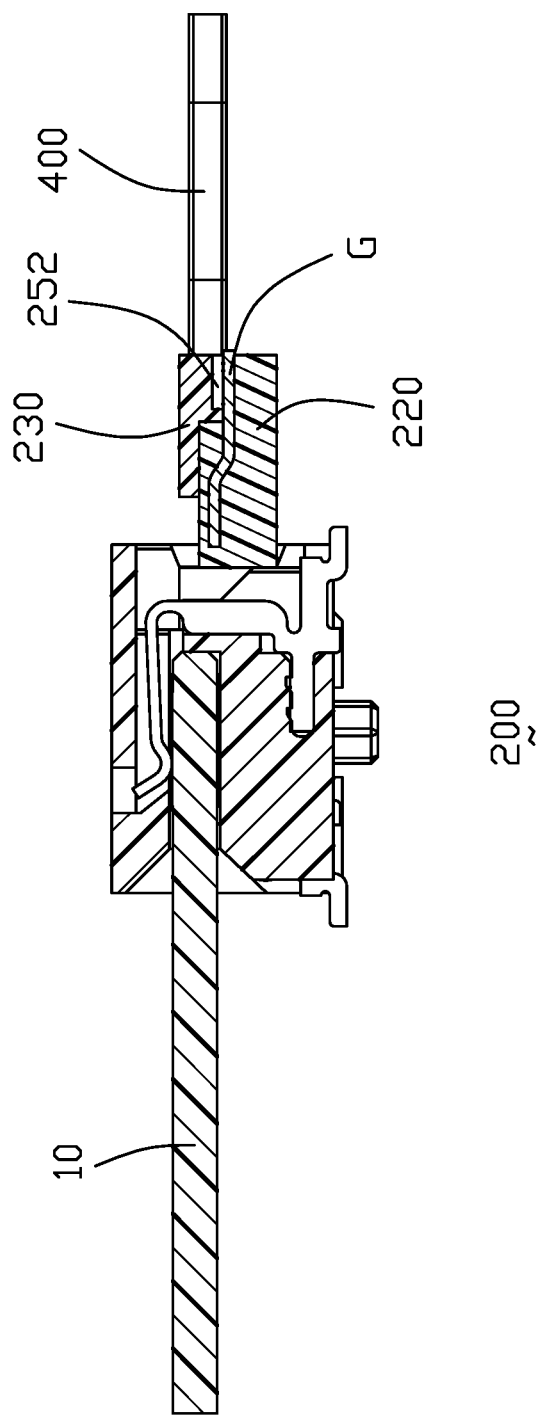
FIG. 14(B) is another cross-sectional view of the cable receptacle connector and the mating tongue of the corresponding SFP module with the associated cable of the electrical interconnection system of FIG. 9.
Figure 14C:
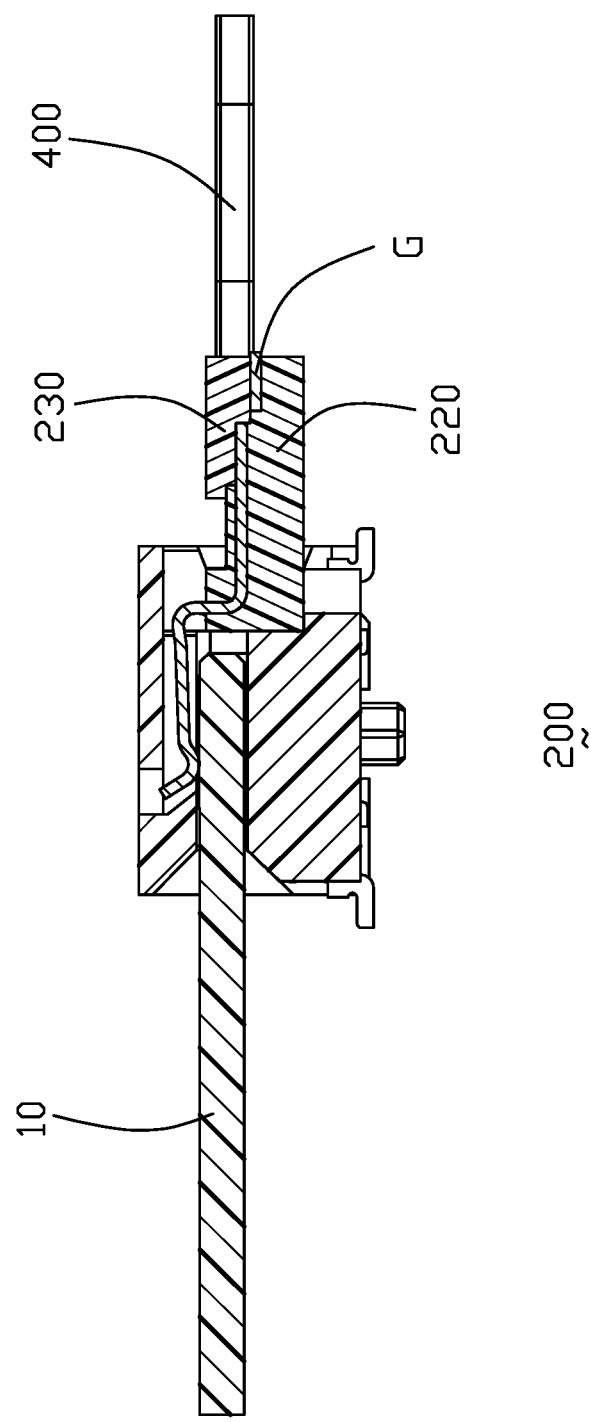
FIG. 14(C) is another cross-sectional view of the cable receptacle connector and the mating tongue of the corresponding SFP module with the associated cable of the electrical interconnection system of FIG. 9.
Figure 15A:
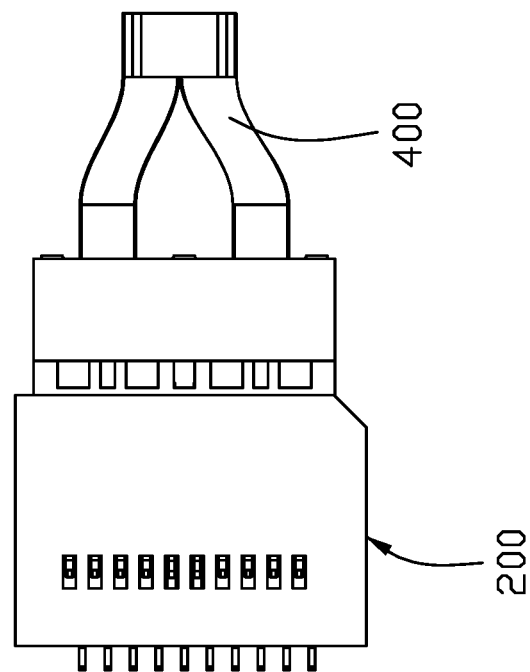
FIG. 15(A) is a top view of the cable receptacle connector and the mating tongue of the corresponding QSFP module with the associated cable of the electrical interconnection system of FIG. 10.
Figure 16A:
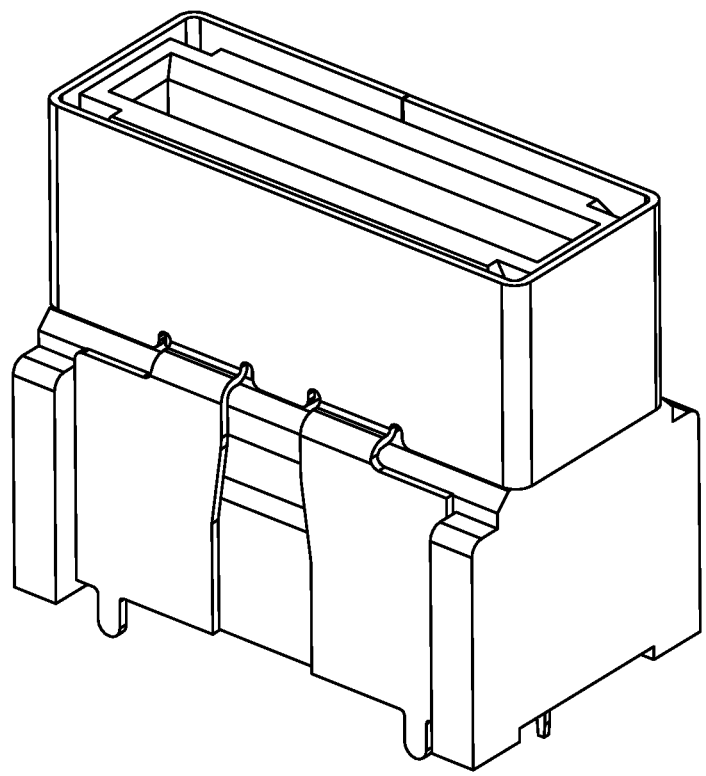
FIG. 16(A) is a perspective view of the board-mount receptacle connector of the electrical interconnection system of FIG. 1.
Figure 16B:
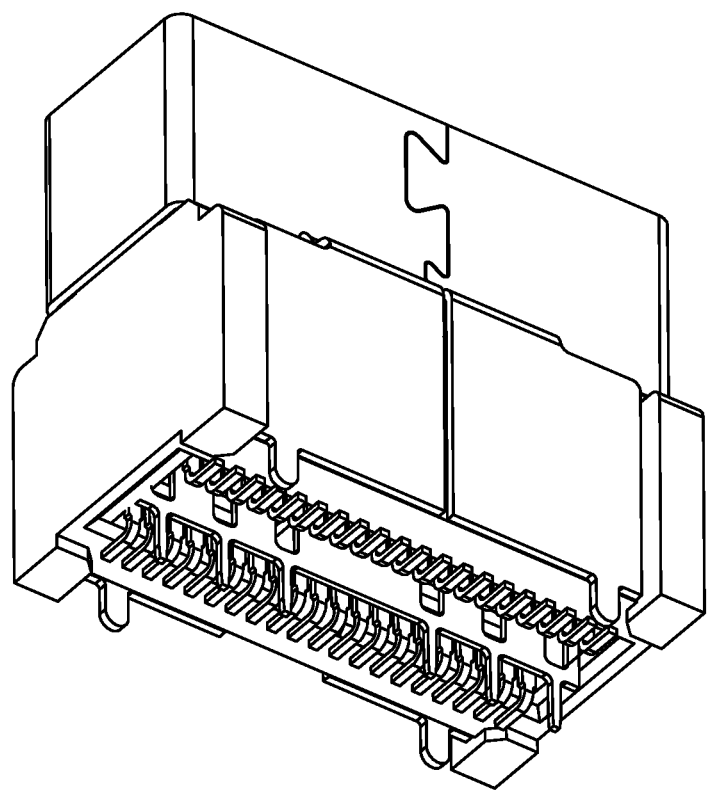
FIG. 16(B) is another perspective view of the board-mount receptacle connector of the electrical interconnection system of FIG. 16(A)
Figure 17A:
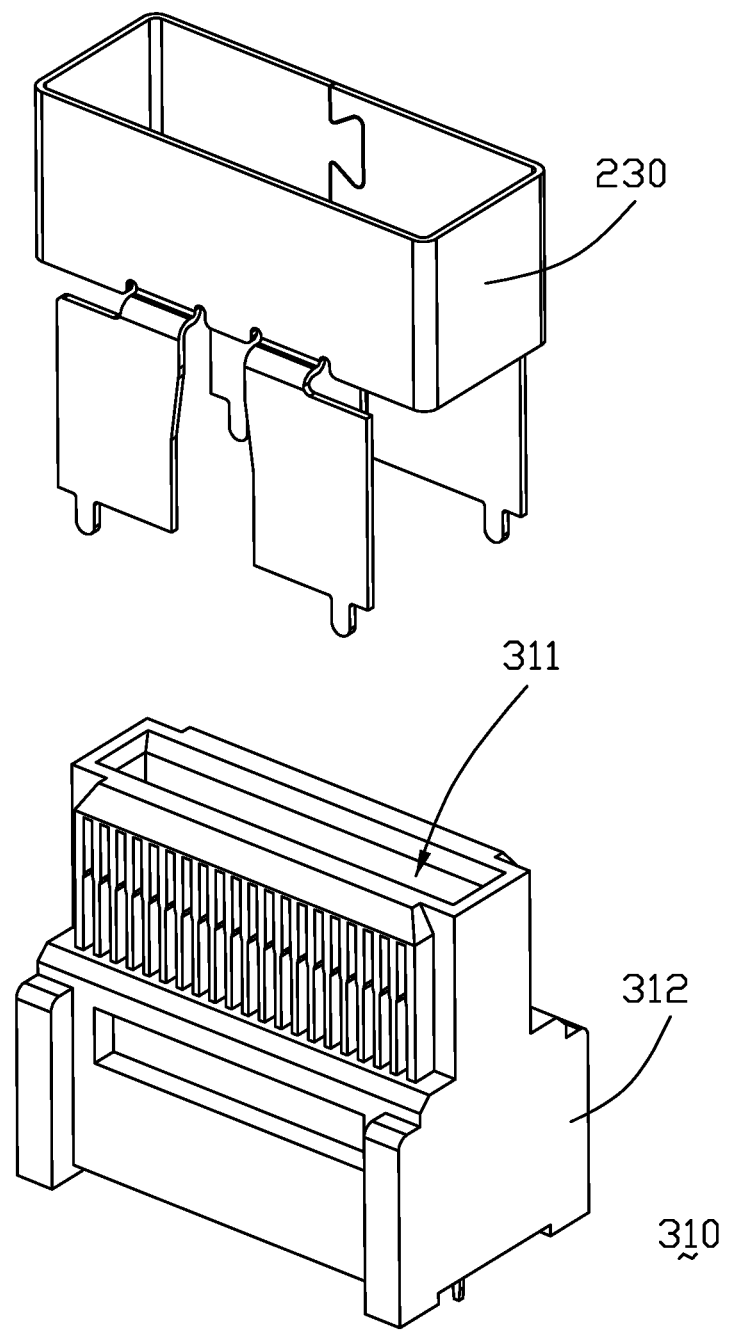
FIG. 17(A) is an exploded perspectives view of the board-mount receptacle connector of the electrical interconnection system of FIG. 16(A)
Figure 18A:
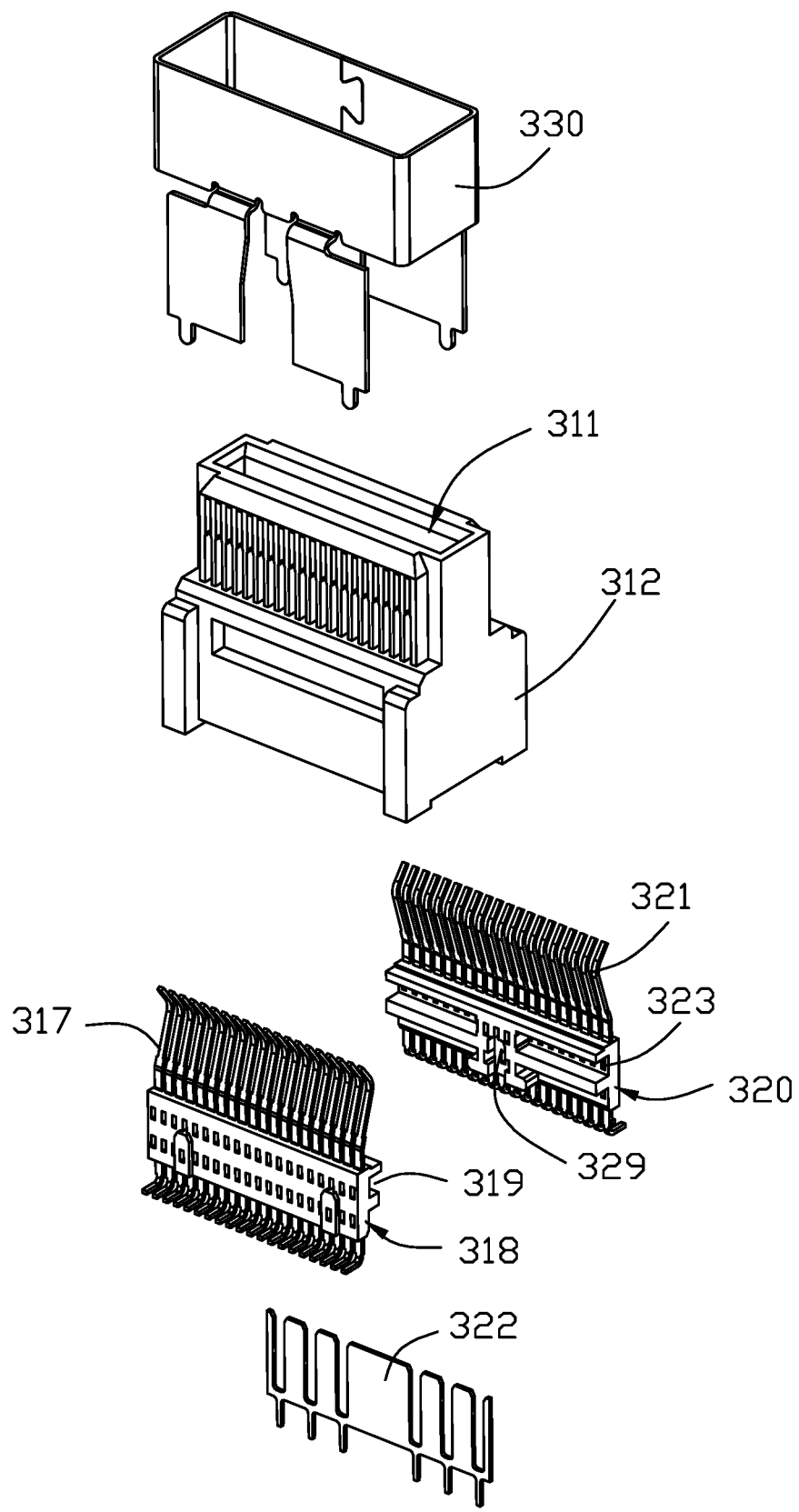
FIG. 18(A) is a further exploded perspective view of the board-mount receptacle connector of the electrical interconnection system of FIG. 17(A)
Figure 18B:
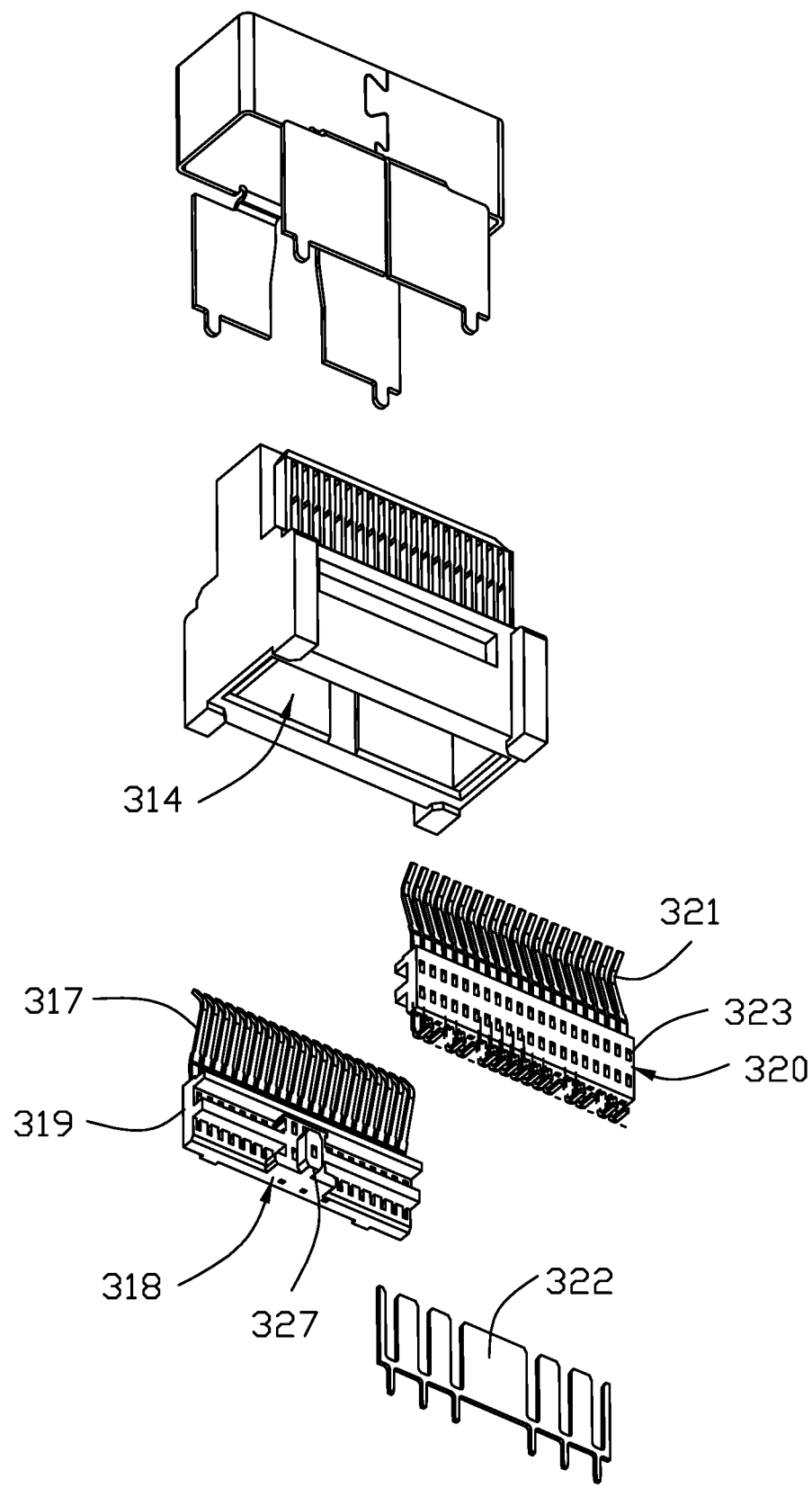
FIG. 18(B) is another further exploded perspective view of the board-mount receptacle connector of the interconnection system of FIG. 18(A)
Figure 18C:
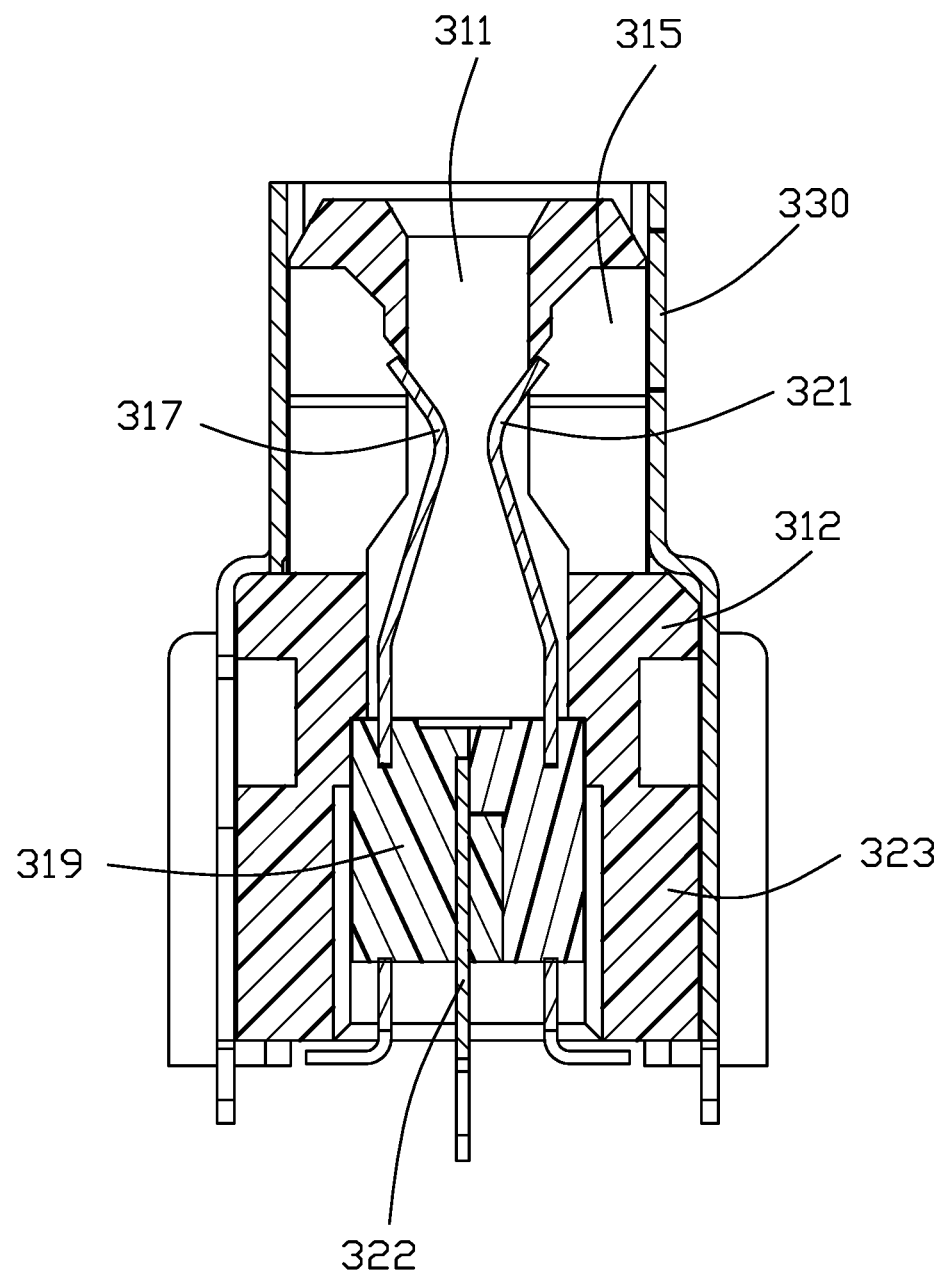
FIG. 18 (C) is a cross-sectional view of the board-mount receptacle connector of the interconnection system of FIG. 16(A)

Referring to FIGS. 1 to 18(C), similar to what is disclosed in the second embodiment of the aforementioned provisional application 62/652,332, an electrical assembly 900 includes a periphery side 910 and a system side 920 linked to each other. The periphery side 910 includes a printed circuit board 100 defining opposite top/first and bottom/second surfaces 102, 104 in the vertical direction. A plurality of first/upper metallic cages 120 are mounted upon the first surface 102 via mounting legs (not labeled), and a plurality of second/lower metallic cages 122 are mounted upon the second surface 104 via mounting legs (not labeled). Each of the first cage 120 and the second cage 122 includes a main body 124, a seat cover 126 and a plurality of dividers 128 assembled together to commonly defines a plurality of receiving cavities 132 for receiving corresponding SFP modules (not shown). The seat cover 126 forms a deflectable locking tab 130 for engagement with the inserted SFP module (not fully shown but a mating tongue 10 thereof). A metallic gasket structure 121 surrounds each of the first cage 120 and the second cage 122 around the corresponding front openings of the receiving cavities 132.

Referring to FIGS. 9 to 15(B), a cable receptacle connector 200 is located around a rear end of each receiving cavity 132 and includes an insulative housing 202 forming a mating slot 204 in a front portion for receiving a mating part of the inserted SFP module (not fully shown but a mating tongue 10 thereof) and a receiving space 206 in a rear portion to receive the contact module 210. A plurality of floor passageways 212 and a plurality of ceiling passageways 214 are formed in the housing 202. A plurality of floor contacts 216 are retained in the corresponding floor passageways 212. Each of the floor contacts 216 has a front contacting section 213 extending into the mating slot 204 and a rear connecting section 215 mounted to the printed circuit board 100 via press fit. Understandably, the floor contacts 216 includes the so-called sideband contacts and grounding contacts thereof, The contact module 210 includes a plurality of ceiling contacts 218 integrally formed within an insulator 220 and extending into the corresponding ceiling passageways 214. Each of the ceiling contacts 218 includes a front contacting section 217 extending into the mating slot 204 and a rear connecting section 219. The ceiling contacts 218 are arranged with two high speed groups each having four contacts 218 wherein the rear connecting sections 219 of middle two contacts 218 are mechanically and electrically connected to a differential pair wires 250, while those of the two outer contacts 218 are unitarily formed with a grounding plate G on which the drain wire 252 and/or a braiding foil (not shown) of the differential pair wires 250 is connected. Notably, the middle two ceiling contacts 218 between the two groups belong to VCC and are assembled forwardly from the rear side and directly mounted upon the printed circuit board 100 via press fit. Such middle two ceiling contracts 218 and the floor contacts 216 both are made by blanking/stamping while the ceiling contacts 218 of the two high speed groups are made by forming. The insulative cover or glue plate 230 is attached upon the insulator 220 to protect the connection between the differential pair wires 250 and the rear connecting sections 219 of the ceiling contacts 218 including the grounding plate G. In this embodiment, the floor contacts 216 and the ceiling contacts 218 are staggered with each other along the transverse direction. Notably, as shown in FIG. 11(D), the neighboring contact modules 210 are commonly protectively received within a same protective cover 600 during shipping.

Referring to FIGS. 16(A) to 18(C), a plurality of board-mount receptacle connectors 310 are mounted upon the main board 300. Each of the board-mount receptacle connectors 310 has an insulating housing 312 with a receiving space 314 to receive a terminal module 316 therein, and a metallic shield 330 enclosing the housing 312. The terminal module 316 includes a left/first terminal unit 318 and a right/second terminal unit 320 to commonly sandwich a middle grounding unit/plate 322 therebetween wherein the upper terminal unit 318 includes a plurality of first terminals 317 integrally formed with a first insulator 319, the second terminal unit 320 includes a plurality of second terminals 321 integrally formed with a second insulator 323. The first terminals 318 and the second terminals 320 received within the corresponding passageways 315 of the housing 312, have corresponding contacting sections extending into the mating slot 311 in the housing 312 for mating with a mating tongue 352 of a corresponding cable plug connector 350. The first insulator 319 forms a protrusion 327 to receive a corresponding groove 324 of the second insulator 323 for retention between the first terminal unit 318 and the second terminal unit 320, Notably, there are two rows of board-mount receptacle connectors 310 commonly mounted upon the upper surface of the main board 300 while respectively located by two sides of the CPU heat sink set 100, viewed along a transverse direction perpendicular to both the vertical direction and the front-to-back direction, for easy conductive trace routing on the main board 300. In a top view, the board-mount receptacle connectors 310 in the front row are aligned with the board-mount receptacle connectors 310 in the rear row in the front-to-back direction, respectively. In this embodiment, the passageways 315 extend transversely and outwardly therethrough the housing 312 while transversely shielded by the metallic shield 330. Notably, the passageways 315 communicate with the receiving space 314 which is occupied by the terminal module 316. Notable, the passageways 315 are not upwardly exposed to an exterior for avoiding dust invasion.

Figure 19A:
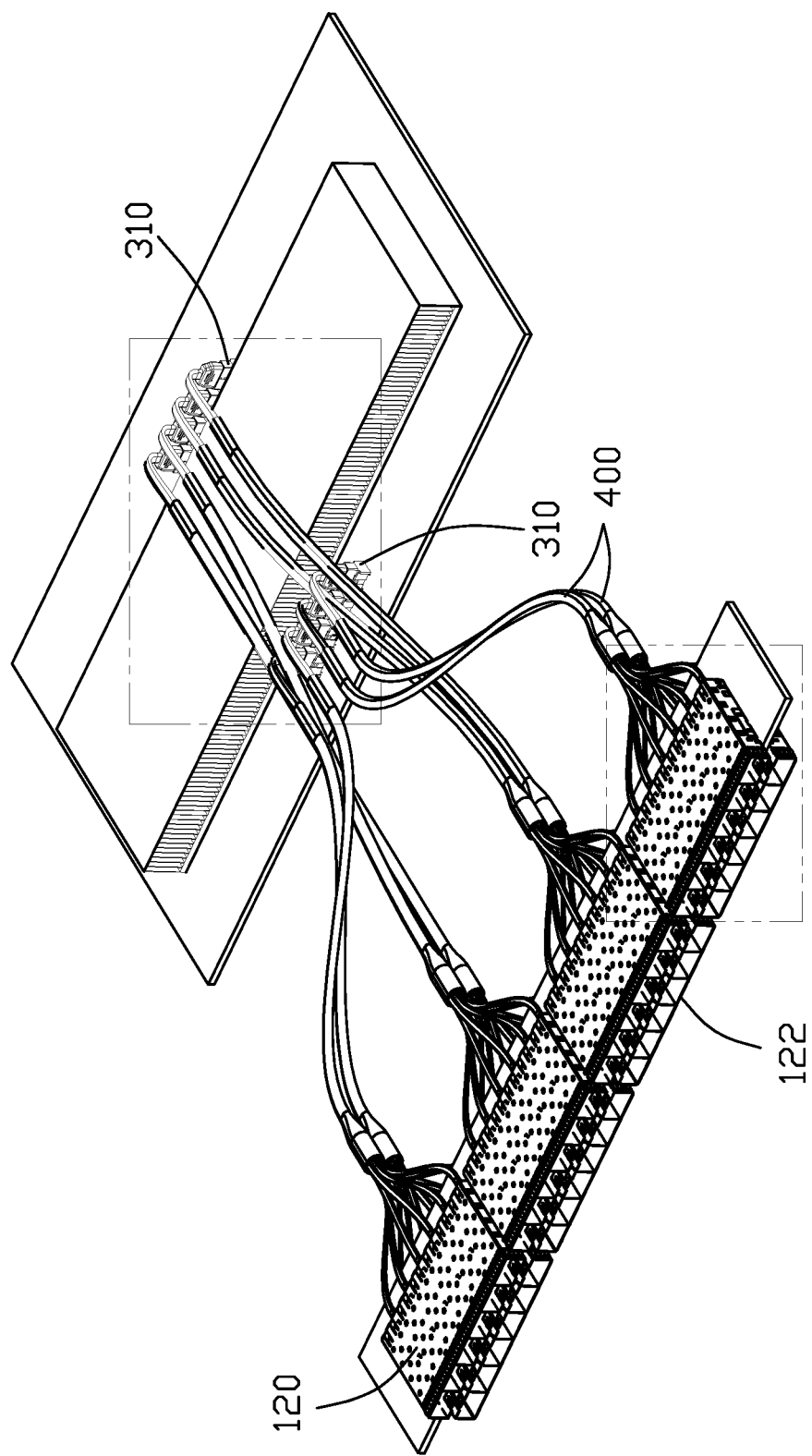
FIG. 19(A) is a perspective view of the interconnection system according to a second embodiment of the invention.
Figure 19B:
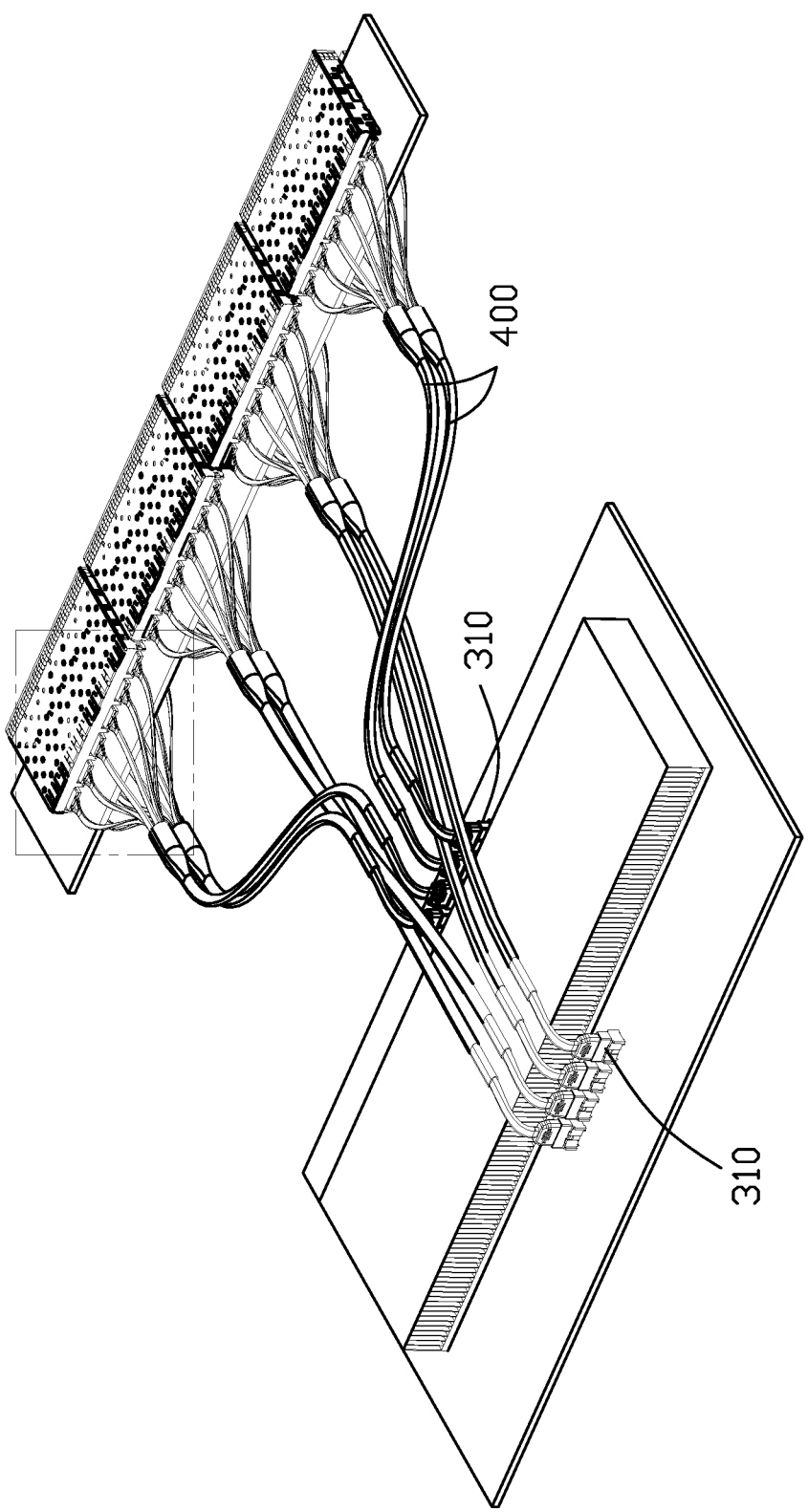
FIG. 19(B) is another perspective view of the interconnection system of FIG. 19(A)
Figure 19C:
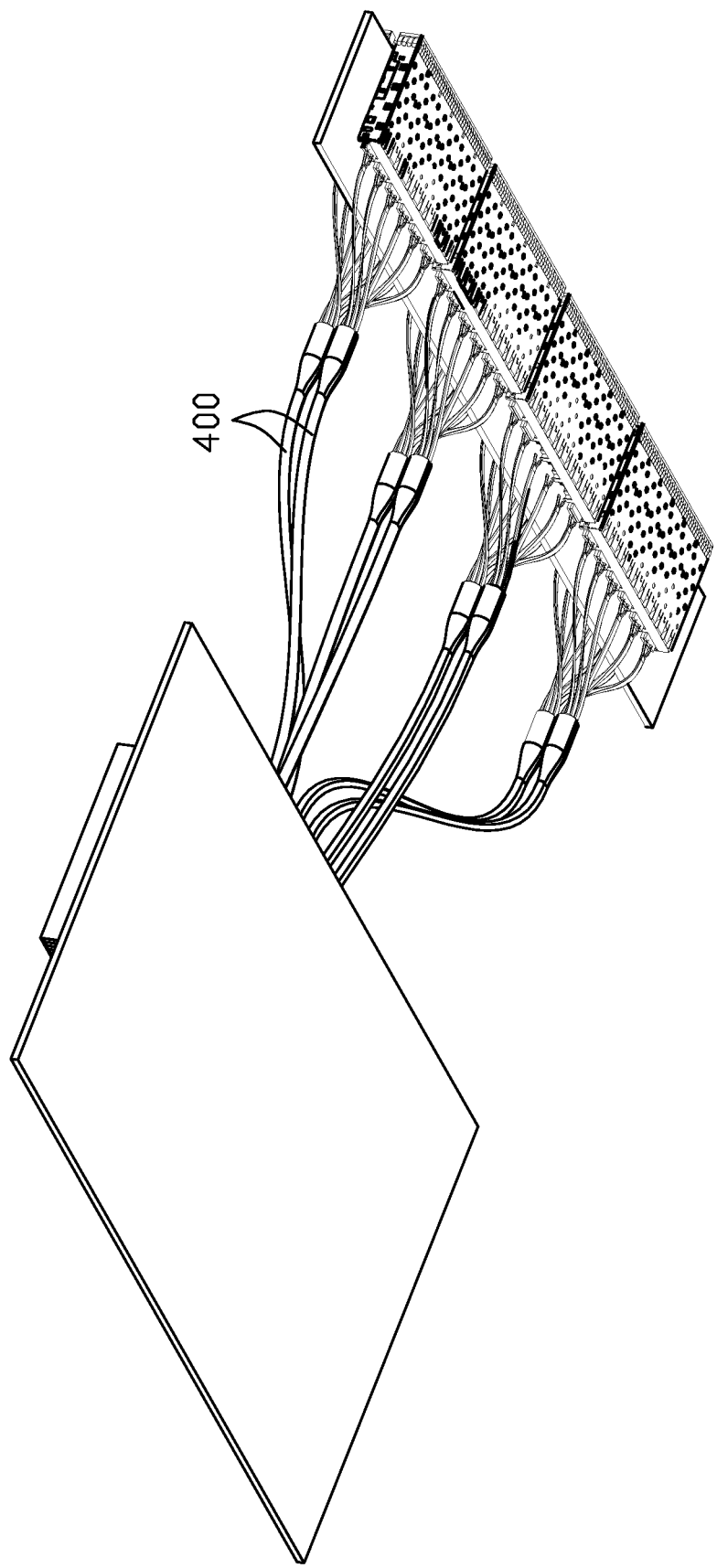
FIG. 19(C) is another perspective view of the electrical interconnection system of FIG. 19(A)
Figure 19D:
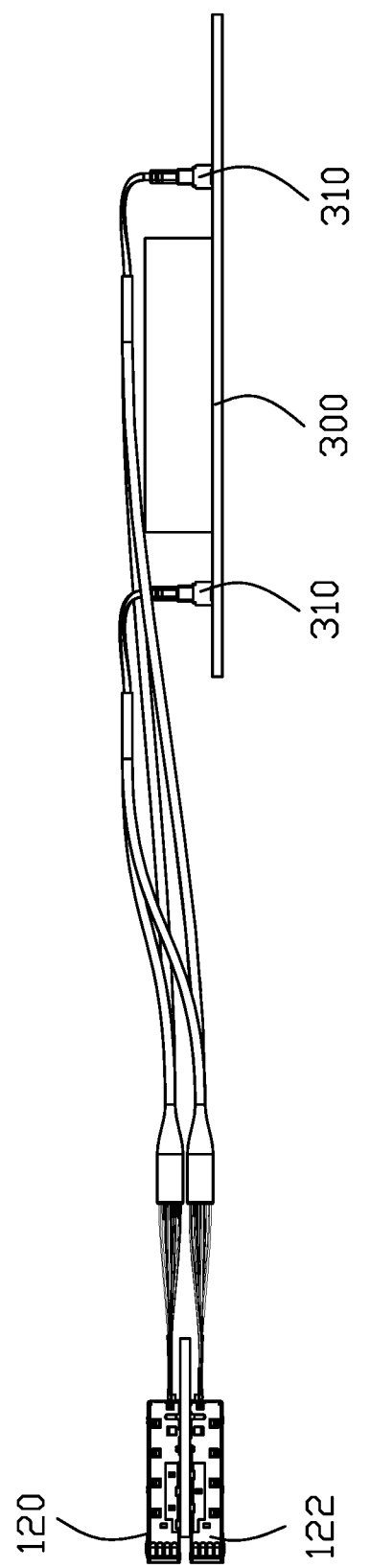
FIG. 19(D) is a side view of the electrical interconnection system of FIG. 19(A)
Figure 19E:
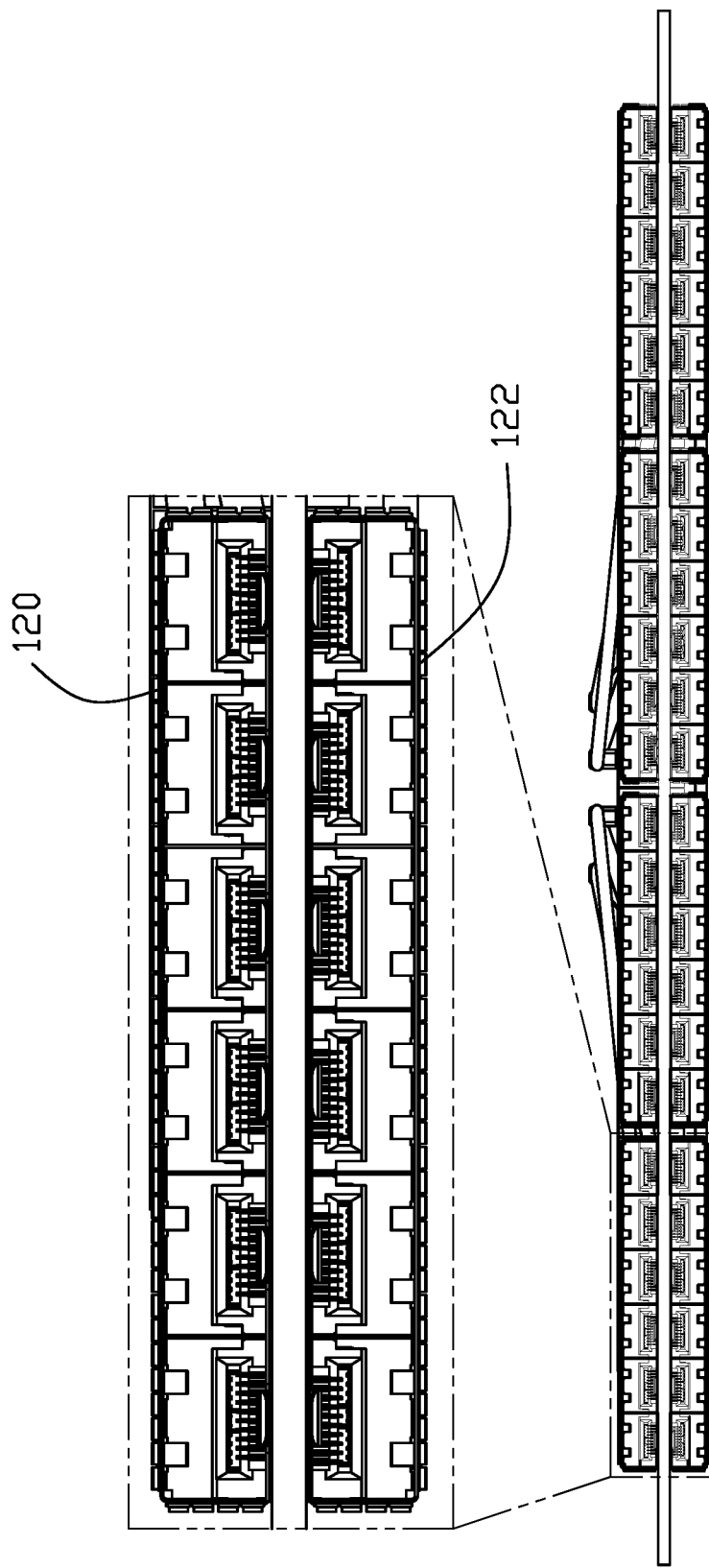
FIG. 19(E) is a front view of the electrical interconnection system of FIG. 19(A)
Figure 19F:
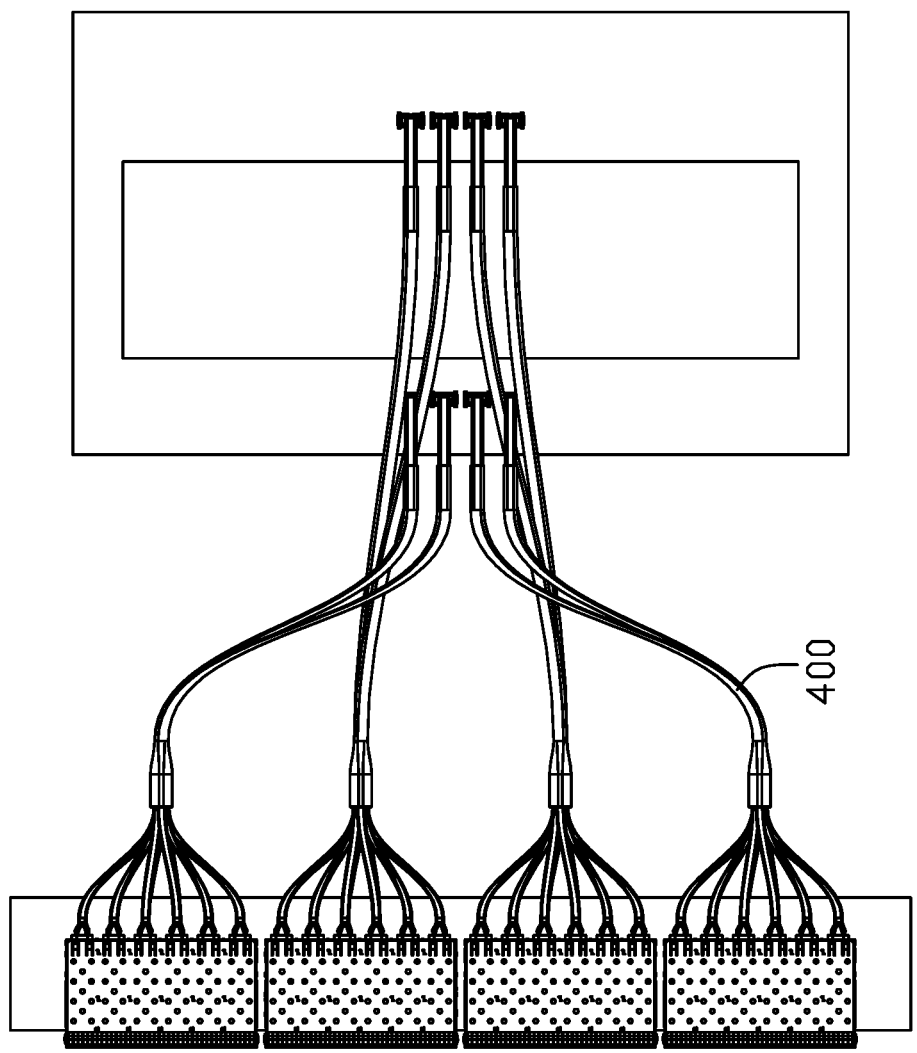
FIG. 19(f) is a top view of the electrical interconnection system of FIG. 19(A)
Figure 20:
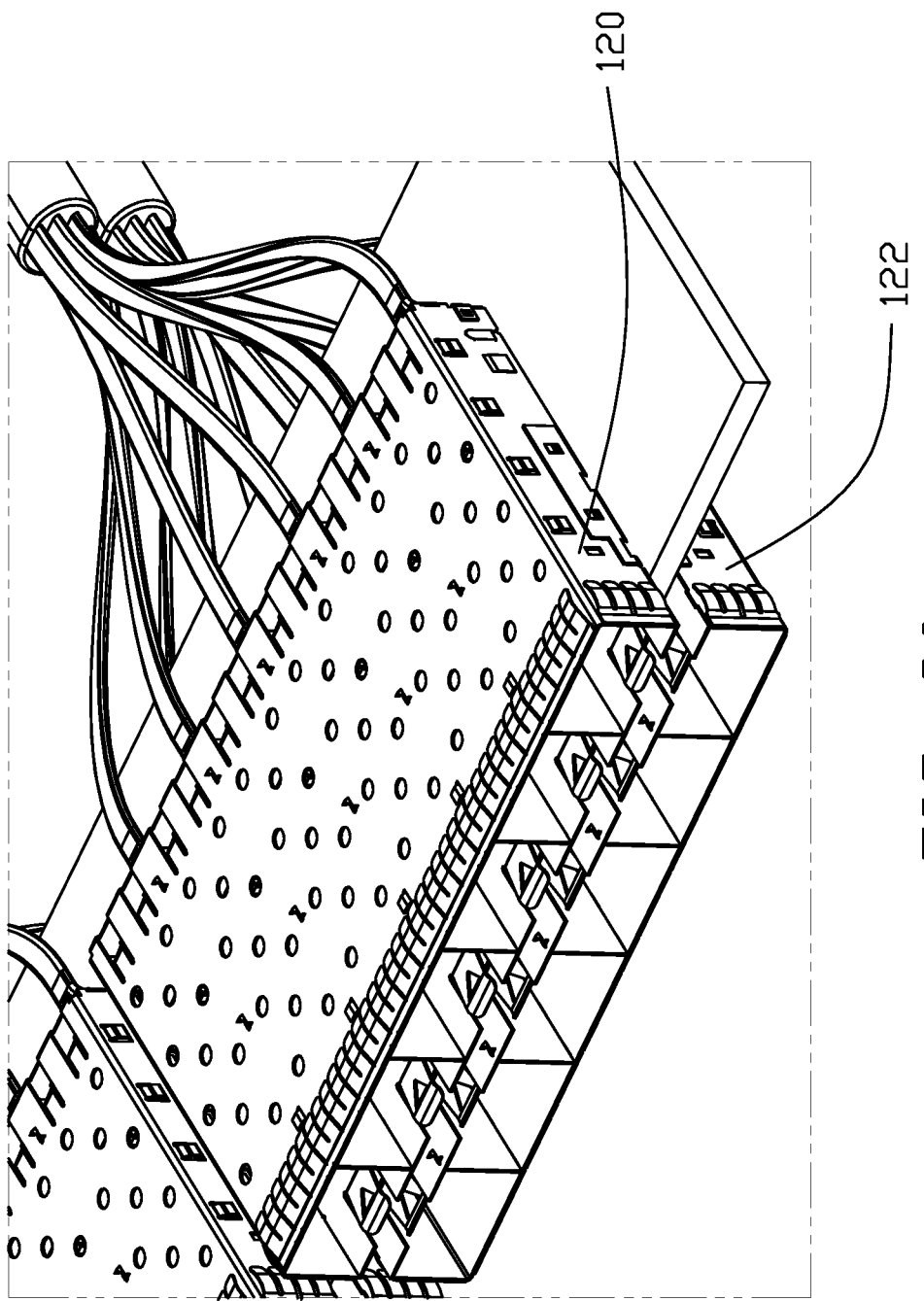
FIG. 20 is an enlarged perspective view of a part of the system side of the electrical interconnection system of FIG. 19(A)
Figure 21:
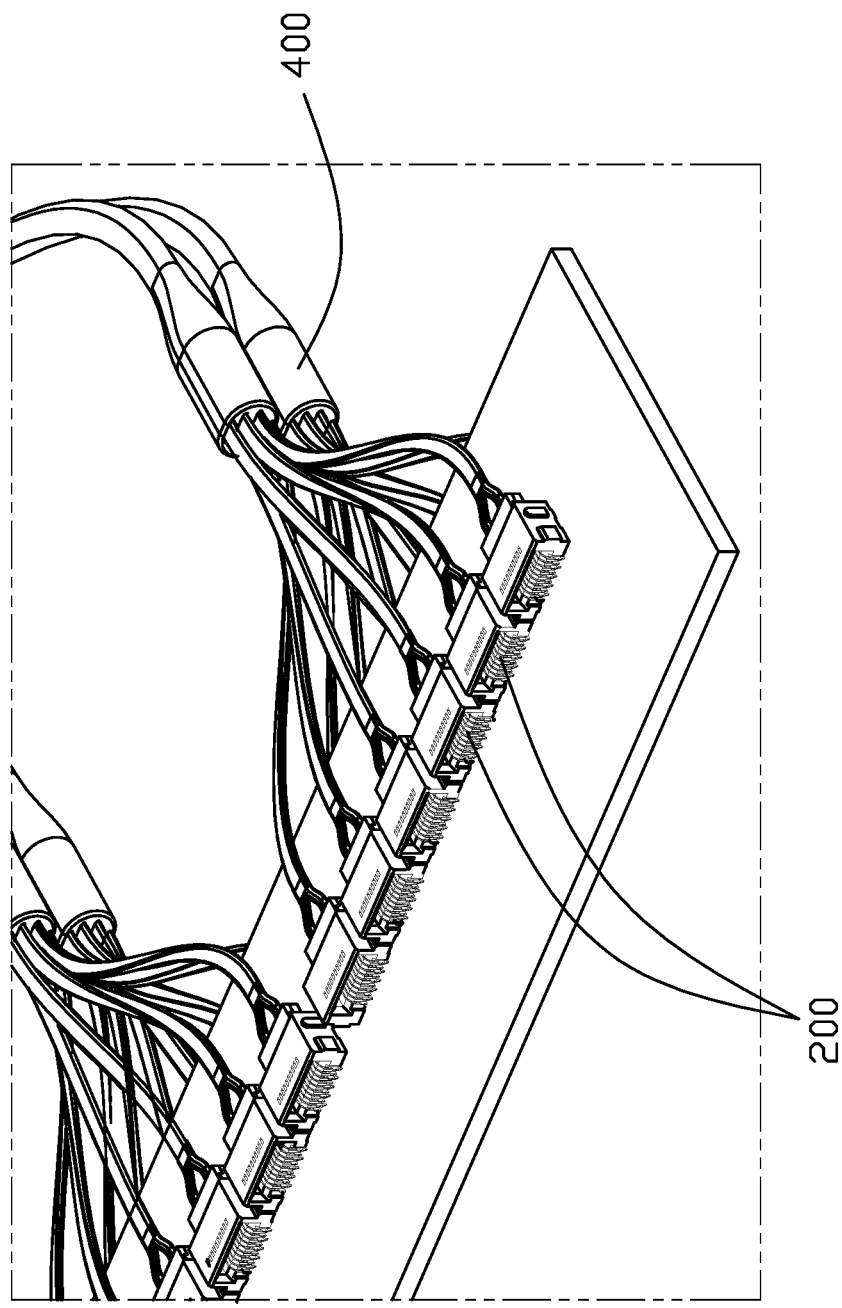
FIG. 21 is an enlarged perspective view of a part of the electrical interconnection system of FIG. 19(A) by removing the cages.
Figure 22:
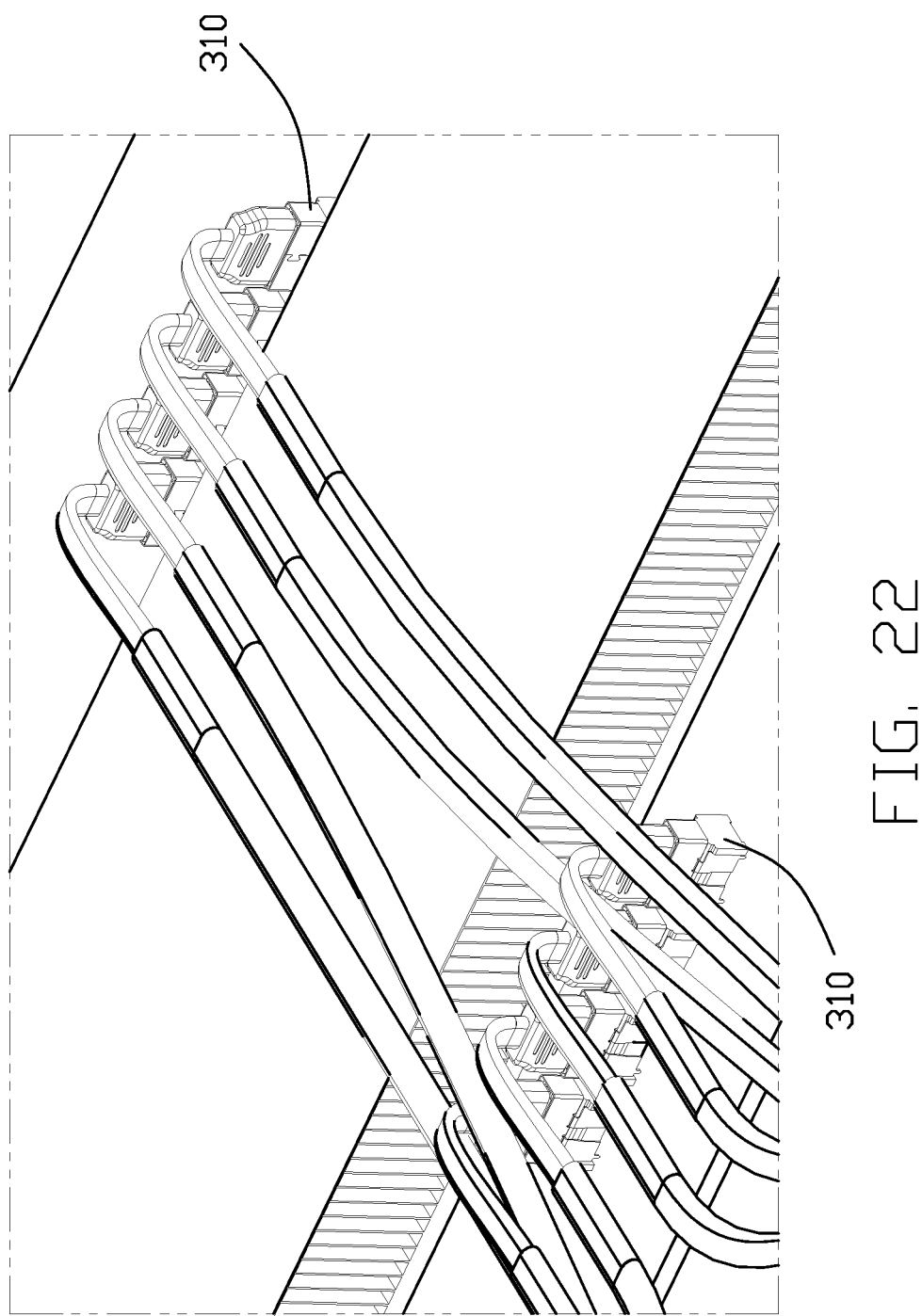
FIG. 22 is an enlarged perspective view of a part of the system side of the electrical interconnection system of FIG. 19(A)
Figure 23:
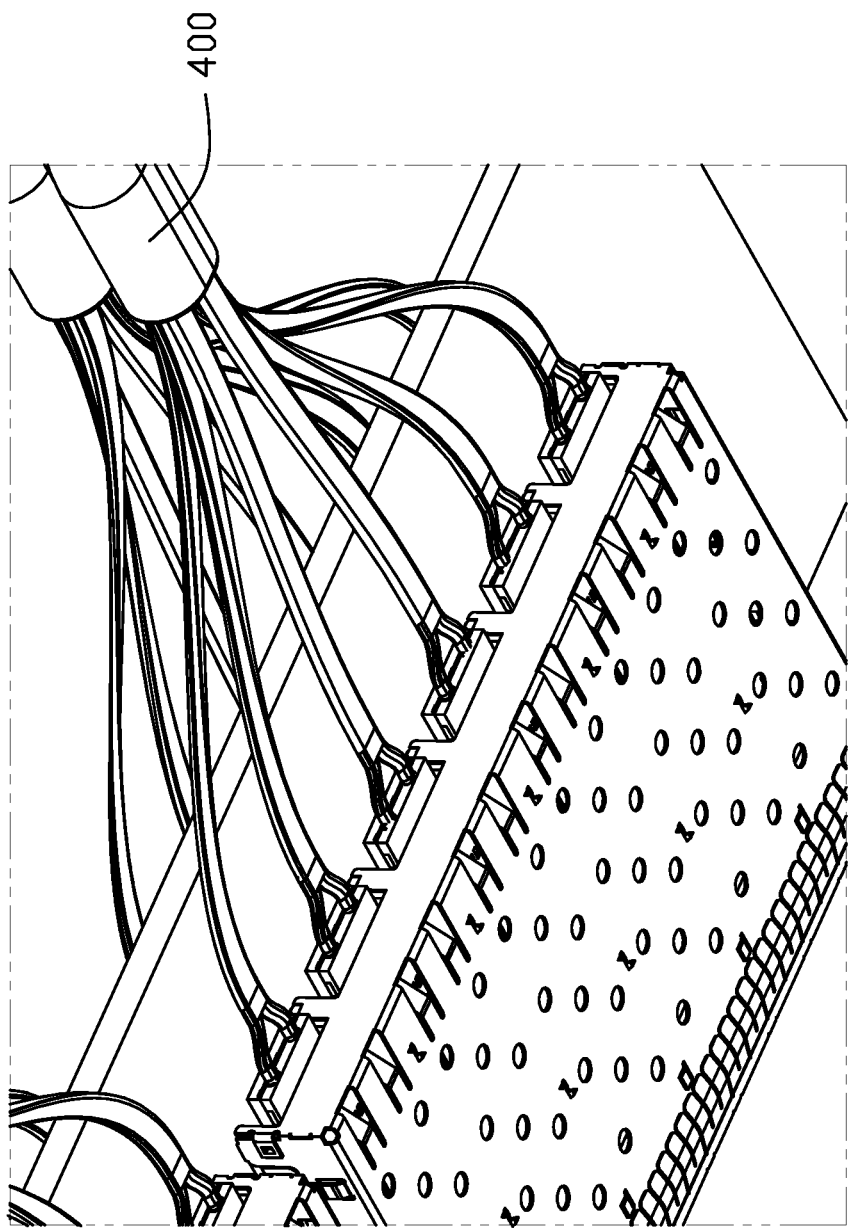
FIG. 23 is another enlarged perspective view of a part of peripheral side of the electrical interconnection system of FIG. 20.
Figure 24:
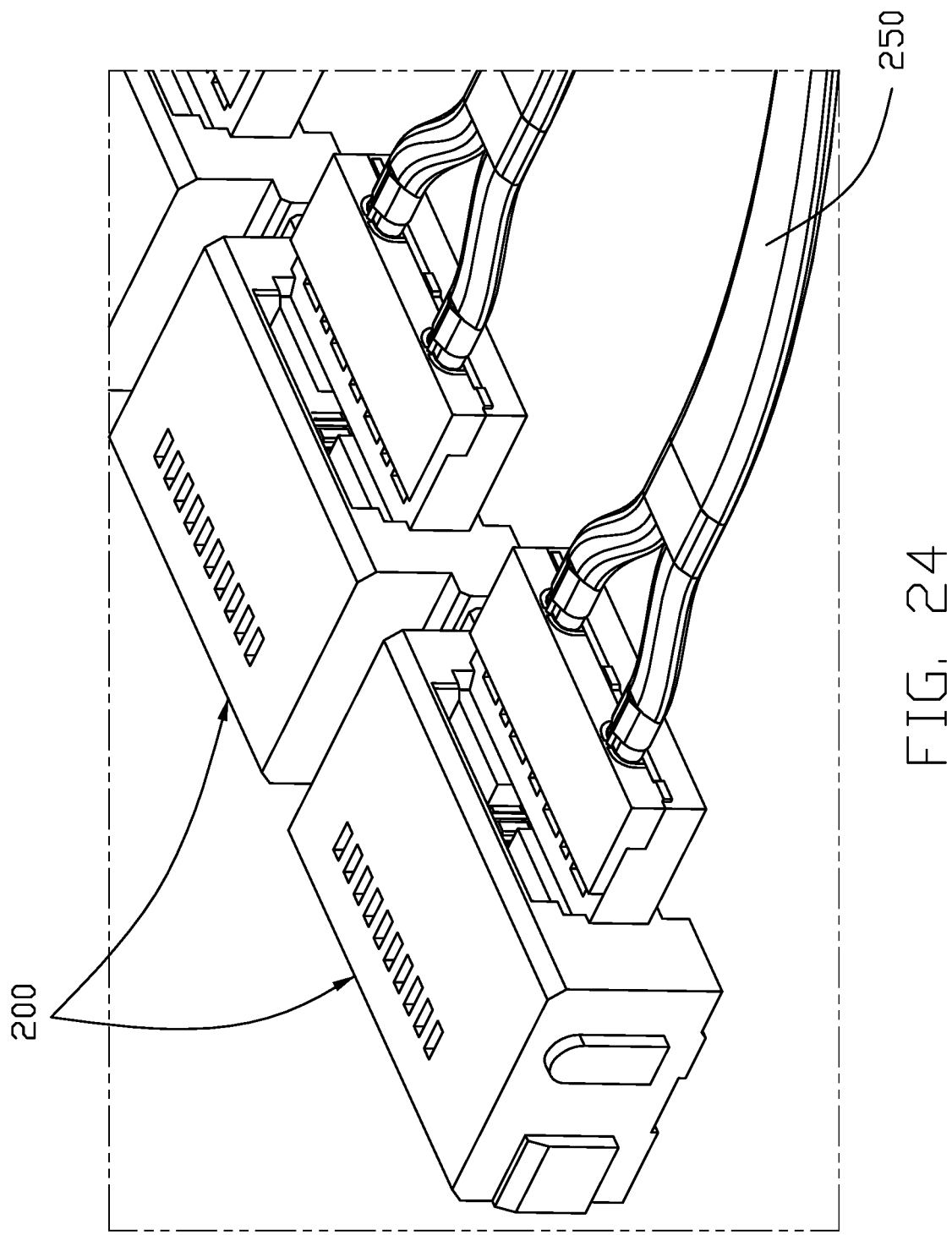
FIG. 24 is an enlarged perspective view of a part of the peripheral side of the electrical interconnection system of FIG. 19(A) to show how the cables are connected to the corresponding cable receptacle connectors, respectively.
Figure 25:
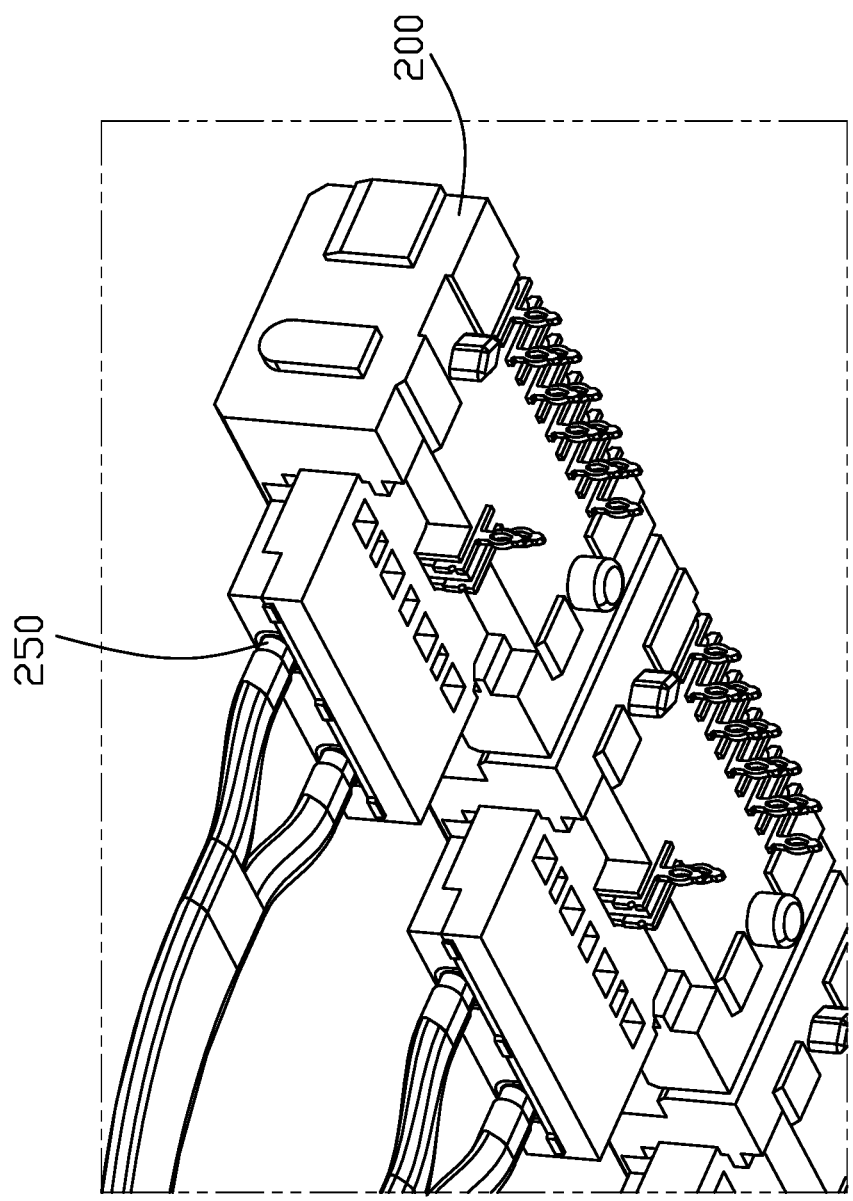
FIG. 25 is another enlarged perspective view of a part of peripheral side of the electrical interconnection system of FIG. 24.
Figure 26A:
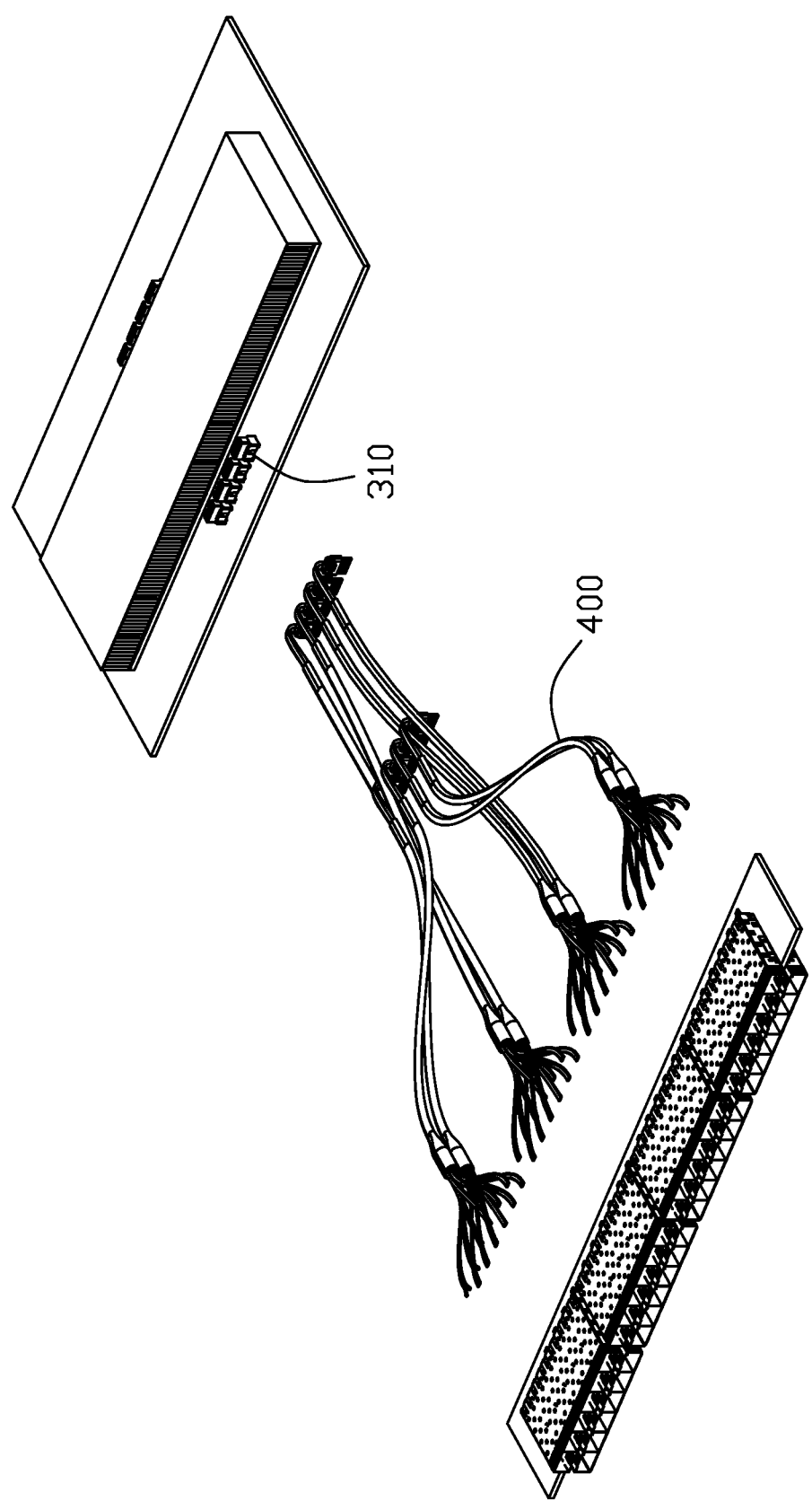
FIG. 26(A) is an exploded perspective view of the electrical interconnection system of FIG. 19(A)
Figure 26B:
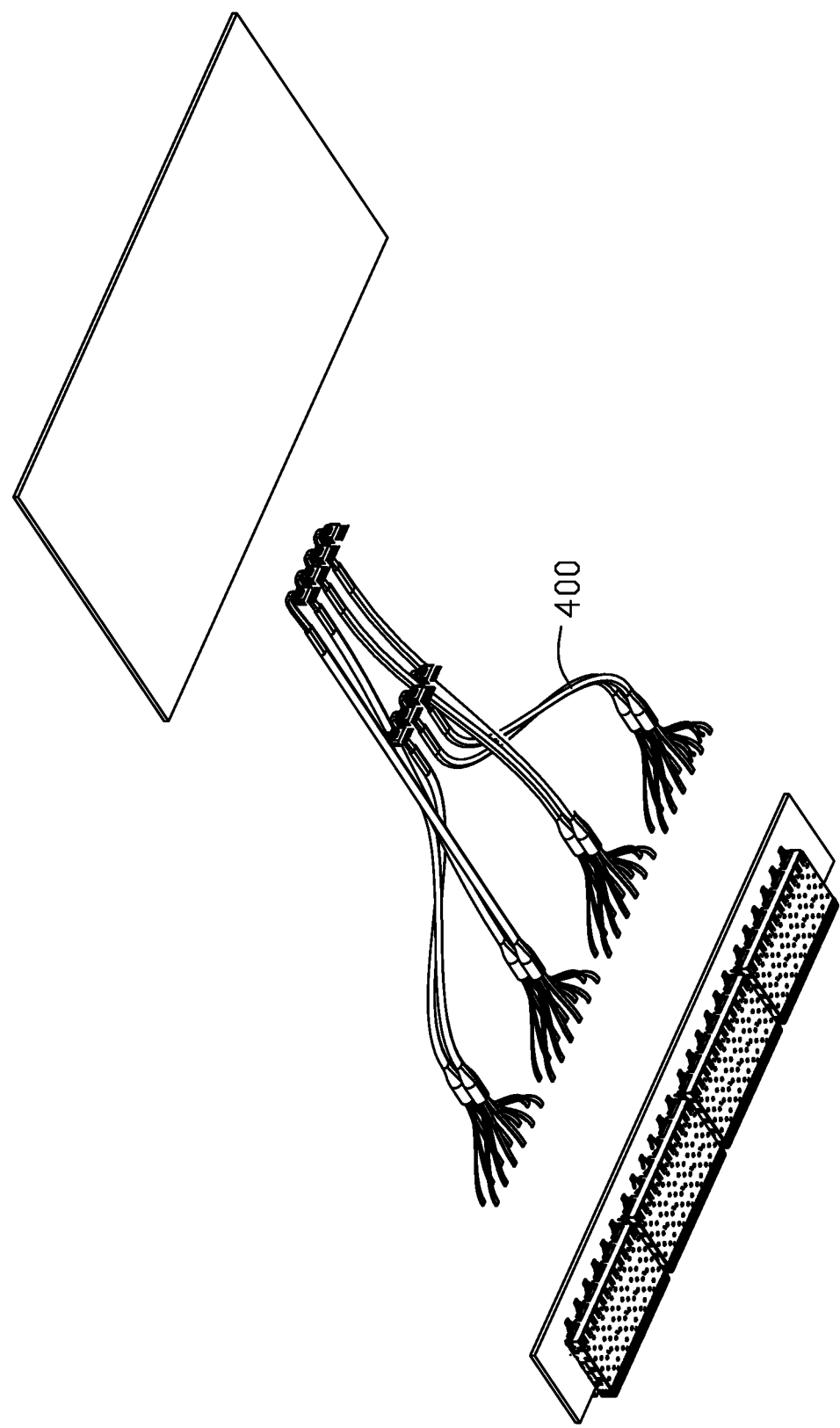
FIG. 26(B) is another exploded perspective view of the electrical interconnection system of FIG. 26(A)
Figure 28:
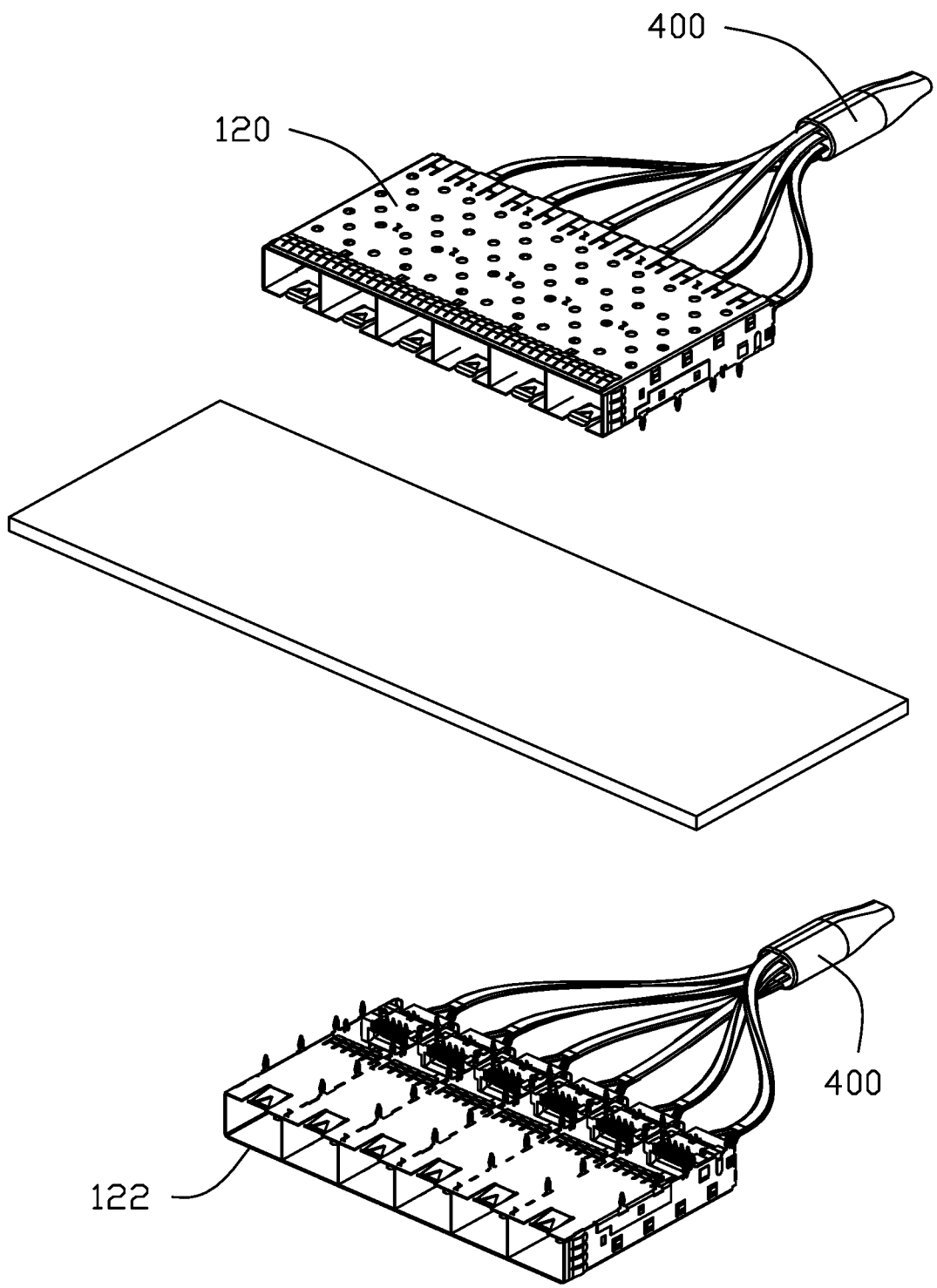
FIG. 28 is a further exploded perspective view of the peripheral side of the electrical interconnection system of FIG. 26(A)
Figure 29A:
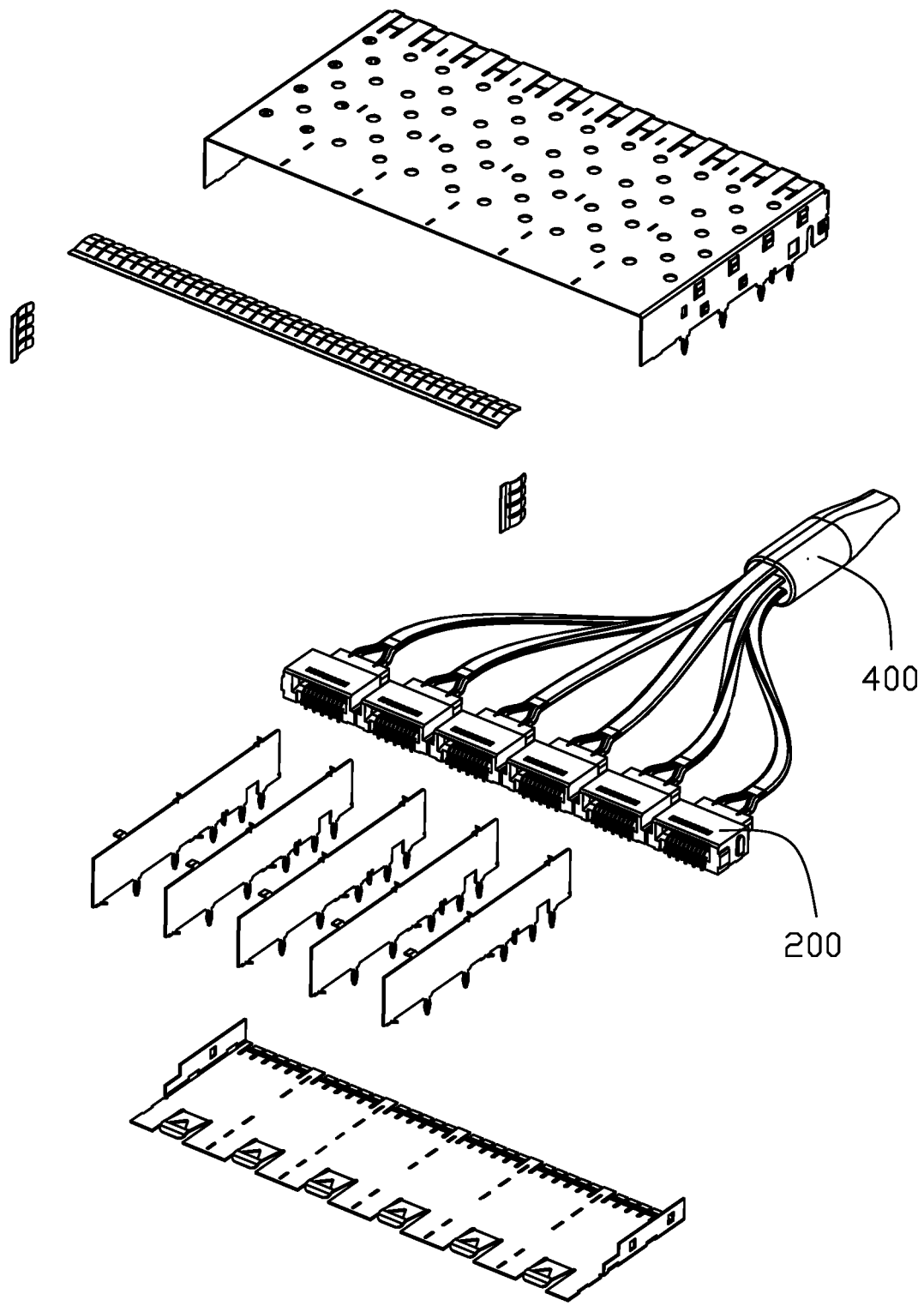
FIG. 29(A) is a further exploded perspective view of the peripheral side of the electrical interconnection system of FIG. 28.
Figure 29B:
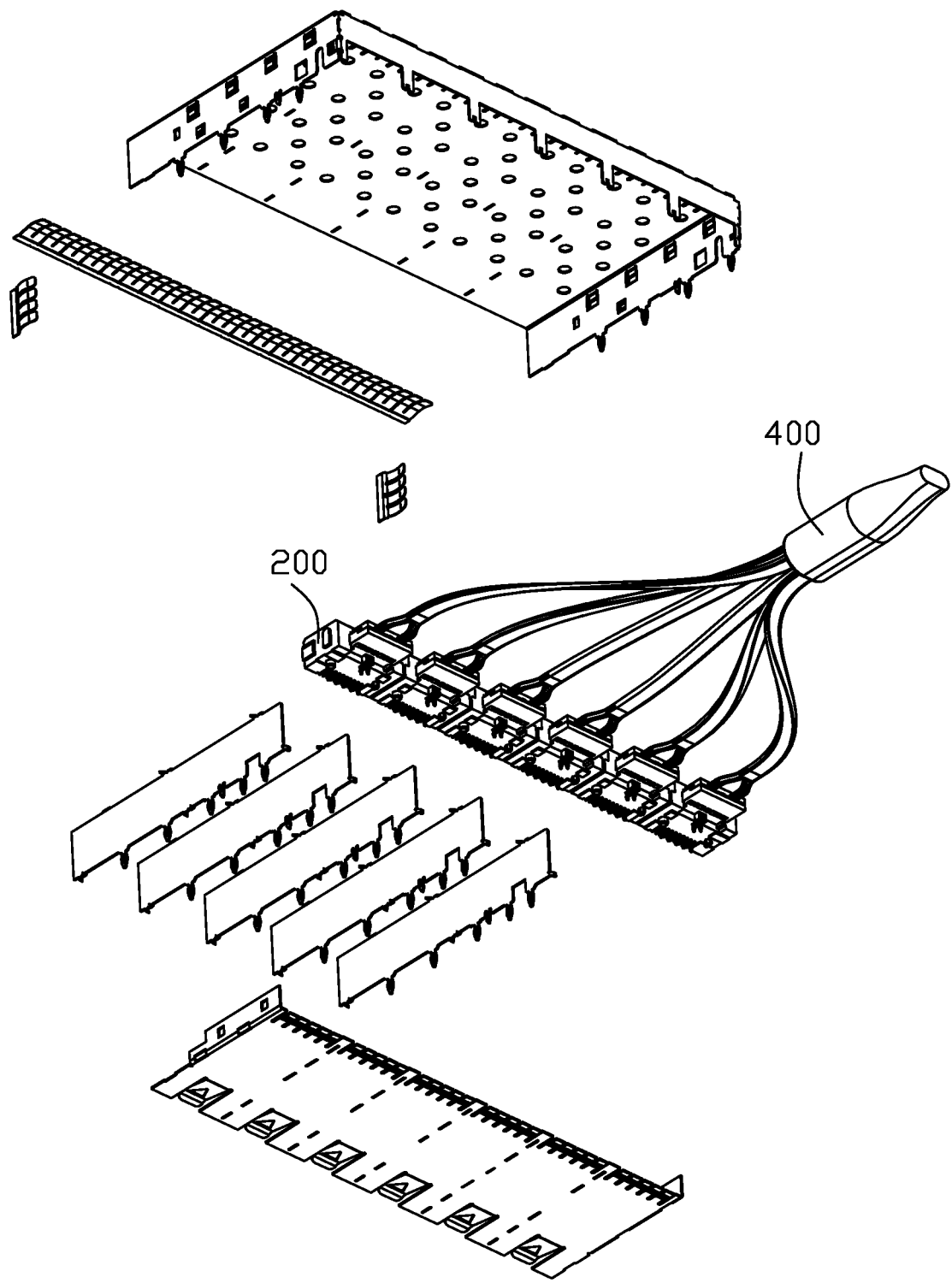
FIG. 29(B) is another further exploded perspective view of the peripheral side of the electrical interconnection system of FIG. 29(A)

Referring to FIGS. 1 (A) to 18(C), A plurality of cables 400 are linked between the cable plug connectors 350 and the corresponding cable receptacle connectors 200 along the front-to-back direction. Each cable 400 is connected to one cable plug connector 350 at one end around the system side 920 for mating with one board-mount receptacle connector 310 while respectively connected to six cable receptacle connectors 200 via six sets of differential pair wires 250 at the other end around the periphery side 910 wherein each set of differential pair wires 250 have two differential pairs for mechanically and electrically connecting to the corresponding two inner pairs of the contacts 218. Three sets differential pair wires 250 of each cable 400 are fixed by a spacer 410, and the other three sets differential pair wires 250 of the cable 400 are fixed by the other spacer 410. All of the spacers 410 are identified the correct attach position that will eliminate accidental "mis-insertion". Notably, the six cable receptacle connectors 200 corresponding to the same one cable 400, are arranged in three neighboring mating cavities 132 in the upper cage 120 and three neighboring mating cavities 132 in the lower cage 122 which are vertically aligned with the aforementioned three neighboring mating cavities 132. In this embodiment, there are totally eight cables 400 in sequence corresponding to eight set of six cable receptacle connectors 200 in sequence of the upper cage 120 and the lower cage 122 wherein the middle four cables 400 are connected to the four board-mount receptacle connectors 310 in the front row and the outer two pairs, i.e., four cables 400 are connected to the four board-mount receptacle connectors 310 in the rear row. Four of the cables 400 connected to the cable receptacle connectors 200 in a middle or inner region are connected to the corresponding board-mount receptacle connector 310 in the front row while the other four cables 400 connected to the cable receptacle connectors 200 in opposite outer side regions is connected to the corresponding board-mount receptacle connector 310 in the rear row. Understandably, this arrangement between the cables 400 and the corresponding board-mount receptacle connectors 310 is for facilitating manufacturing. Alternately, for achieving the similar lengths of all cables as illustrated in the second embodiment below, the cable 400 connecting to the inner region cable receptacle connector 200 is connected to the board-mount receptacle connector 310 in the rear row, while the cable 400 connecting to the outer region cable receptacle connector 200 is connected to the corresponding board-mount receptacle connector 310 in the front row FIGS. 19(A)-30 show a second embodiment of the invention with two major differences with regard to the first embodiment. In the first embodiment, each cable 400 integrates three cable receptacle connectors 200 in the upper cage 120 and the corresponding three cable receptacle connectors 200 in the lower cage 122 while in the second embodiment each cable 400 integrates all six cable receptacle connector in either the same upper cage 120 or the same lower cage 122. This arrangement may have the sets of the differential wires in each cable 400 more orderly and systematically compared with those in the first embodiment. Secondly, to achieve the similar lengths of all cables 400, the cables linked to the upper/lower cages 120, 122 in the two opposite outer regions are connected to the corresponding board-mount receptacle connectors 310 in the front row, and those in the middle region are connected to the corresponding board-mount receptacle connectors in the rear row. Notably, in both the first embodiment and the second embodiment, each of the upper cage 120 and the lower cage 122 encloses six cable receptacle connectors 200.

What is claimed is:
1. An electrical interconnection system comprising:
a periphery side and a system side connected with each other via a plurality of cables;
the periphery side including:
a first printed circuit board;
a plurality of cages mounted upon the first printed circuit board;
a plurality of receiving cavities formed in the corresponding cages for receiving modules therein;
a plurality of cable receptacle connectors located at rear portions of said receiving cavities, respectively;

the system side including:
  a second printed circuit board; and
  two rows of board-mount receptacle connectors mounted upon a same surface of the second printed circuit board; wherein
  the plurality of cables are connected between the cable receptacle connectors and the board-mount receptacle connectors; and
  each of said cables has one end connected to one corresponding board-mount receptacle connector and the other end connected to at least three neighboring cable receptacle connectors.

2. The interconnection system as claimed in claim 1, wherein the cages are arranged upon two opposite upper and lower surfaces of the first printed circuit board to formed upper cages and lower cages, the receiving cavities comprising upper rows of receiving cavities formed by the upper cages, and lower rows of receiving cavities formed by the lower cages, the cable receptacle connectors comprising an upper row and a lower row of cable receptacle connectors located at rear portions of said upper and lower rows of receiving cavities, respectively.

3. The interconnection system as claimed in claim 1, wherein each of the cables is connected to three neighboring cable receptacle connectors in the upper row and three neighboring cable receptacle connectors in the lower row.

4. The interconnection system as claimed in claim 3, wherein said three neighboring cable receptacle connectors in the upper row are aligned with said three neighboring cable receptacle connectors in the lower row in the vertical direction, respectively.

5. The interconnection system as claimed in claim 4, wherein each of said cables comprises six sets of differential pair wires, and each set comprises two pairs.

6. The interconnection system as claimed in claim 5, wherein three sets differential pair wires of each cable are fixed by a spacer, and another three sets differential pair wires of the cable are fixed by another spacer.

7. The interconnection system as claimed in claim 4, wherein each cable is integrally connected to the corresponding cable receptacle connectors while is detachably connected to the corresponding board-mount receptacle connector through a cable plug connector mated with the corresponding board-mount receptacle connector.

8. The interconnection system as claimed in claim 1, wherein the board-mount receptacle connectors are arranged in a front row and a rear row.

9. The interconnection system as claimed in claim 8, wherein the front row of board-mount receptacle connectors and the rear row of board-mount receptacle connectors are respectively located by two sides of a CPU heat sink set in the front-to-back direction.

10. The interconnection system as claimed in claim 8, wherein the front row of board-mount receptacle connectors and the rear row of board-mount receptacle connectors are aligned with each other in a front-to-back direction in a top view.

11. The interconnection system as claimed in claim 8, wherein the cable connected to the cable receptacle connectors in a middle region is connected to the corresponding board-mount receptacle connector in the front row while the cable connected to the cable receptacle connectors in two outer side regions is connected to the corresponding board-mount receptacle connector in the rear row.

12. The interconnection system as claimed in claim 1, wherein the first printed circuit board and the second printed circuit board are discrete from each other.

13. An electrical interconnection system comprising:
  a periphery side and a system side connected with each other via a plurality of cables;
  the periphery side including:
    a first printed circuit board;
    upper and lower cages respectively upon two opposite upper and lower surfaces of the first printed circuit board;
    upper and lower rows of receiving cavities formed in the corresponding upper and lower cages for receiving upper and lower rows of modules therein;
    upper and lower rows of cable receptacle connectors located at rear portions of said upper and lower rows of receiving cavities, respectively;
  the system side including:
    a second printed circuit board;
    front and rear rows of board-mount receptacle connectors mounted upon a same surface of the second printed circuit board; and
  the plurality of cables connected between the cable receptacle connectors and the board-mount receptacle connectors, each of said cables having one end connected to one corresponding board-mount receptacle connector, and the other end connected to all six neighboring cable receptacle connectors in a same upper cage or a same lower cage.

14. The electrical interconnection system as claimed in claim 13, wherein the cable connected to the cage in an outer region is connected to the corresponding board-mount receptacle connector in a front row while the cable connected to the cage in an inner region is connected to the corresponding board-mount receptacle connector in a rear row so as to keep similar lengths of all cables.

15. The electrical interconnection system as claimed in claim 13, wherein the front row of the board-mount receptacle connectors and the rear row of the board-mount receptacle connectors are located by two sides of a CPU (Central Processing Unit) and opposite to each other in front-to-back direction.

16. An electrical interconnection system comprising:
  a periphery side and a system side connected with each other via a plurality of cables;
  the periphery side including:
    a first printed circuit board;
    a plurality of cages mounted upon the first printed circuit board;
    a plurality of receiving cavities formed in the corresponding cages for receiving modules therein;
    a plurality of cable receptacle connectors located at rear portions of said receiving cavities, respectively;
  the system side including:
    a second printed circuit board;
    at least one row of board-mount receptacle connectors mounted upon a same surface of the second printed circuit board; and
    the plurality of cables connected between the cable receptacle connectors and the board-mount receptacle connectors; wherein
    each of said cables having one end is connected to one corresponding board-mount receptacle connector, and the other end having three sets of differential pairs is connected to at least three neighboring cable receptacle connectors; wherein
    each of said board-mount receptacle connectors includes:
      an insulative housing having an upper mating slot and a lower receiving space communicating with each other in a vertical direction, a plurality of passageways located by two sides of the mating slot in a transverse direction perpendicular to the vertical direction and communicating with the receiving space in the vertical direction; and a terminal module received within the receiving space and having a pair of terminal units commonly sandwiching a grounding plate unit therebetween in the transverse direction, each of the terminal units including a plurality of terminals extending into the corresponding passageways, respectively, with corresponding contacting sections extending into the mating slot.

17. The electrical interconnection system as claimed in claim 16, further including a metallic shield, wherein each of said passageways extends transversely ad outwardly through the housing and covered by the metallic shield in the transverse direction.

18. The electrical interconnection system as claimed in claim 16, wherein the cages are mounted upon two opposite surfaces of the first printed circuit board while the board-mount receptacle connectors are the same surface of the second printed circuit board.

19. The electrical interconnection system as claimed in claim 18, wherein each of said cages receives said at least three cable receptacle connectors.

* * * * *